(12) United States Patent
Yasini et al.

(10) Patent No.: US 11,979,851 B2
(45) Date of Patent: May 7, 2024

(54) USER EQUIPMENT KINEMATIC STATE ESTIMATION

(71) Applicant: Telefonaktiebolaget LM Ericsson (publ), Stockholm (SE)

(72) Inventors: Sholeh Yasini, Sundbyberg (SE); Richard Middleton, North Lambton (AU); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 17/619,598

(22) PCT Filed: Jun. 18, 2019

(86) PCT No.: PCT/SE2019/050575
§ 371 (c)(1),
(2) Date: Dec. 16, 2021

(87) PCT Pub. No.: WO2020/256603
PCT Pub. Date: Dec. 24, 2020

(65) Prior Publication Data
US 2022/0312366 A1 Sep. 29, 2022

(51) Int. Cl.
*H04W 64/00* (2009.01)
*G01S 11/10* (2006.01)

(52) U.S. Cl.
CPC ......... *H04W 64/006* (2013.01); *G01S 11/10* (2013.01)

(58) Field of Classification Search
CPC ..... H04W 88/04; H04W 64/00; H04W 4/029; H04W 36/32; H04W 4/025; H04W 4/026; H04W 84/06; H04W 4/33; H04W 8/24
See application file for complete search history.

(56) References Cited

U.S. PATENT DOCUMENTS 6,609,080 B1 * 8/2003 Syrjarinne ......... H03H 17/0257
702/150
2009/0243920 A1  10/2009 Anand et al.
(Continued)

FOREIGN PATENT DOCUMENTS

EP       1102397 A2    5/2001

OTHER PUBLICATIONS

International Search Report and Written Opinion of the International Searching Authority, PCT/SE2019/050575, dated Oct. 2, 2019, 23 pages.

(Continued)

*Primary Examiner* — Kwasi Karikari
(74) *Attorney, Agent, or Firm* — Sage Patent Group

(57) ABSTRACT

A method for kinematic state estimation of a user equipment connected to a wireless communication network includes obtaining range rate measurement data defining a change rate of a distance between the user equipment and a range rate measuring position and obtaining range measurement data defining a distance between the user equipment and a range measuring position. A kinematic state estimation of the user equipment is performed based on at least the range rate measurement data and the range measurement data. The kinematic state estimation includes interacting-multiple-model filtering using three interacting models. The interacting-multiple-model filtering includes a three-dimensional constant velocity movement Wiener process, a three-dimensional constant acceleration movement Wiener process, and a three-dimensional constant position Wiener process.

19 Claims, 15 Drawing Sheets

(56) References Cited

U.S. PATENT DOCUMENTS

2015/0094100 A1    4/2015   Opshaug et al.
2018/0206075 A1    7/2018   Demirdag et al.

OTHER PUBLICATIONS

Markoulidakis, J.G. et al., "Part Two: Kalman filtering options for error minimization in statistical terminal assisted mobile positioning," Computer Communications, 31, 2008, pp. 1138-1147.
Wigren, Torbjörn, "Wireless Hybrid Positioning Based on Surface Modeling with Polygon Support," Proc. 2018 IEEE $8^{th}$ Vehicular Technology Conference (VTC Spring), Jun. 2018, Porto. Portugal, 7 pages.
Extended European Search Report Patent Application No. EP 19735660.3 dated May 12, 2023, 8 pages.

\* cited by examiner

Fig. 18
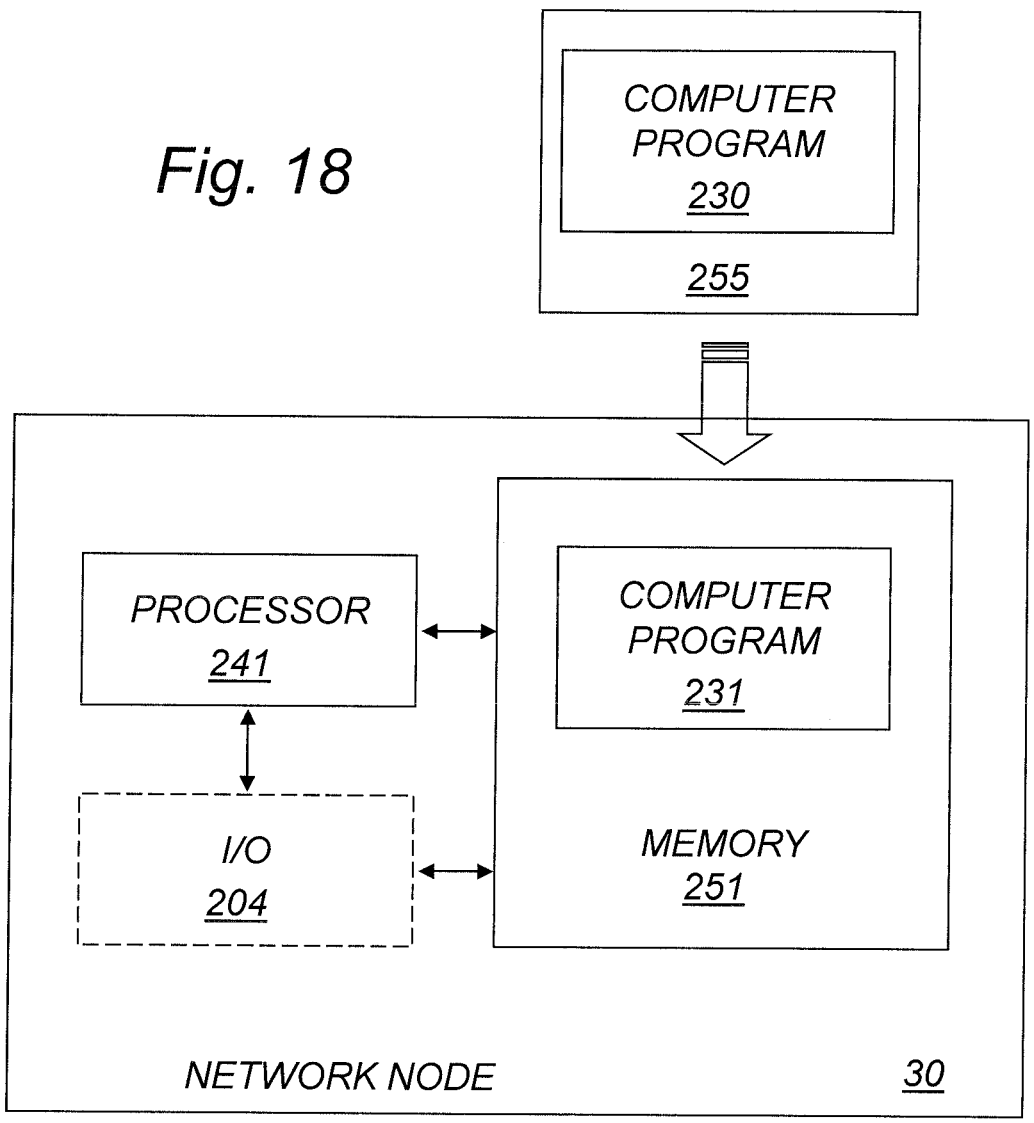
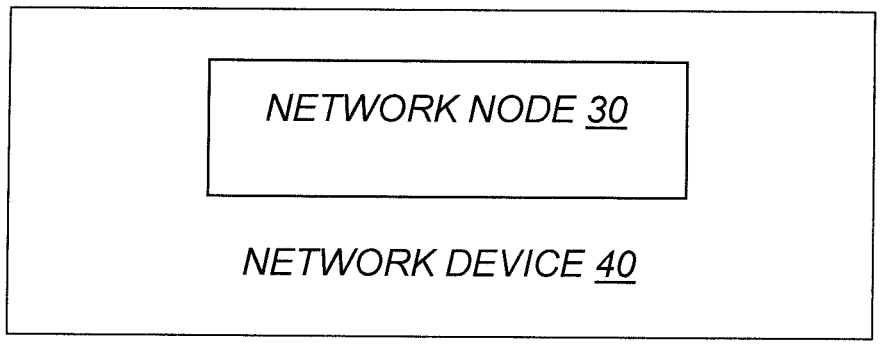
Fig. 19

USER EQUIPMENT KINEMATIC STATE ESTIMATION

CROSS REFERENCE TO RELATED APPLICATIONS

This application is a 35 U.S.C. § 371 national stage application of PCT International Application No. PCT/SE2019/050575 filed on Jun. 18, 2019, the disclosure and content of which is incorporated by reference herein in its entirety.

TECHNICAL FIELD

The proposed technology generally relates to user equipment state estimation and in particular to methods for kinematic state estimation of a user equipment, methods assisting the same, nodes for kinematic state estimation of a user equipment and nodes for assisting the same.

BACKGROUND

Today, airborne radio-controlled drones are becoming more and more common. These drones have in the past been limited to stay within range of the radio control equipment dedicated to control the drone. However, recently functionality allowing drones to be remotely controlled over the cellular network has increased their range considerable. This can e.g. be achieved by attaching a Long-Term Evolution (LTE) User Equipment (UE) to the drone and by coupling the UE to the navigation system of the drone. This way, the drone is enabled to travel over multiple cells, resulting in ranges that is limited only by the battery of the drone. In some markets, this is already being regulated, and UEs attached to drones are registered as such. However, a large number of users fail to register. Such users being denoted as "rogue drones".

The LTE (or in the future New Radio (NR)) capable drones need to be restricted in terms of their flight. This is particularly the case for rogue drones. A first reason for this is that rogue drones that transmit and receive cellular radio messages at significant altitudes tend to create more interference than ground based UEs. This is simply explained by that there are less obstacles when the altitude of the drone is significant. Propagation can then be close to free-space propagation. The interference therefore reaches further and creates interference problems also in adjacent cells. At higher altitudes drones may also be served by the side lobes of radio base station antennas that are down-tilted. This may increase the risk of sudden signal changes.

A second reason is that rogue drones create hazardous situations when flying illegally in certain parts of the airspace. Examples include airports, where commercial air traffic may be at danger, and the airspace over densely populated areas where a crash would be likely to cause human injuries. Note that this is likely to be a major concern for aviation authorities and thereby for cellular operators. Very recently, Gatwick International Airport, London UK, had to close down for many hours due to rogue drones. Early in 2019, the same situation occurred at Heathrow International Airport, London, UK. There is thus a need for technology that can pinpoint the location of rouge drones with an accuracy that allows countermeasures to be exercised effectively.

The general problem is hence to mitigate illegal flying with so called rogue drones, or at least identify rouge drones for enabling counter measures.

SUMMARY

It is an object to provide kinematic state estimations of UEs.

This and other objects are met by embodiments of the proposed technology.

According to a first aspect, there is provided a method for kinematic state estimation of a UE connected to a wireless communication network. The method comprises obtaining of range rate measurement data defining a change rate of a distance between the UE and a range rate measuring position. The method further comprises obtaining of range measurement data defining a distance between the UE and a range measuring position. A kinematic state estimation of the UE is performed based on at least the range rate measurement data and the range measurement data. The kinematic state estimation comprises interacting-multiple-model filtering using three interacting models. The interacting-multiple-model filtering comprises a three-dimensional constant velocity movement Wiener process, a three-dimensional constant acceleration movement Wiener process, and a three-dimensional constant position Wiener process.

According to a second aspect, there is provided a method for assisting in kinematic state estimation of UEs connected to a wireless communication network. The method comprises obtaining of range rate measurement data defining a change rate of a distance between the UE and a range rate measuring position. The method further comprises obtaining of range measurement data defining a distance between the UE and a range measuring position. The measurement information related to a multitude of range rate measurement data and a multitude of range measurement data is compiled into compiled measurement information. A transferring of the compiled measurement information to a kinematic state estimation node is initiated.

According to a third aspect, there is provided a node, configured for kinematic state estimation of a UE connected to a wireless communication network. The node is configured to obtain range rate measurement data defining a change rate of a distance between the UE and a range rate measuring position. The node is further configured to obtain range measurement data defining a distance between the UE and a range measuring position. The node is further configured to perform a kinematic state estimation of the UE based on at least the range rate measurement data and the range measurement data. The node is configured to perform the kinematic state estimation by utilizing interacting-multiple-model filtering comprising three interacting models. The interacting-multiple-model filtering comprises a three-dimensional constant velocity movement Wiener process, a three-dimensional constant acceleration movement Wiener process, and a three-dimensional constant position Wiener process.

According to a fourth aspect, there is provided a node, configured for assisting in kinematic state estimation of a UE connected to a wireless communication network. The node is configured to obtain range rate measurement data defining a change rate of a distance between the UE and a range rate measuring position. The node is further configured to obtain range measurement data defining a distance between the UE and a range measuring position. The node is further configured to compile the measurement information related to a multitude of range rate measurement data and a multitude of range measurement data into compiled measurement information. The node is further configured to initiate a transferring of the compiled measurement information to a kinematic state estimation node.

According to a fifth aspect, there is provided a wireless communication network comprising at least one node according to the third aspect.

According to a sixth aspect, there is provided a computer program comprising instructions, which when executed by at least one processor, cause the at least one processor to obtain range rate measurement data defining a change rate of a distance between the UE and a range rate measuring position, to obtain range measurement data defining a distance between the UE and a range measuring position, and to perform a kinematic state estimation of the UE based on at least the range rate measurement data and the range measurement data. The kinematic state estimation comprises interacting-multiple-model filtering comprising three interacting models. The interacting-multiple-model filtering comprises a three-dimensional constant velocity movement Wiener process, a three-dimensional constant acceleration movement Wiener process, and a three-dimensional constant position Wiener process.

According to a seventh aspect, there is provided a computer program comprising instructions, which when executed by at least one processor, cause the at least one processor to obtain range rate measurement data defining a change rate of a distance between the UE and a range rate measuring position, to obtain range measurement data defining a distance between the UE and a range measuring position, to compile the measurement information related to a multitude of range rate measurement data and a multitude of range measurement data into compiled measurement information, and to initiate a transferring of the compiled measurement information to a kinematic state estimation node.

According to an eighth aspect, there is provided a computer-program product comprising a computer-readable medium having stored thereon a computer program of the sixth or seventh aspect.

According to a ninth aspect, there is provided a carrier comprising the computer program of the sixth or seventh aspect, wherein the carrier is one of an electronic signal, an optical signal, an electromagnetic signal, a magnetic signal, an electric signal, a radio signal, a microwave signal, or a computer-readable storage medium.

According to a tenth aspect, there is provided a signal, configured to be communicated in a wireless communication network. The signal represents kinematic state estimate information of a UE. The kinematic state estimate information comprises a kinematic state estimate information identifier, a UE identity, a time when the kinematic state estimate information is valid, and an estimated kinematic state of the UE. The estimated kinematic state comprises at least a three-dimensional position and preferably also a three-dimensional velocity.

An advantage of the proposed technology is that a kinematic state estimation of a UE can be obtained in a radio base station.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 18 is a schematic diagram illustrating an embodiment of a computer-implementation of a network node;

FIG. 19 is a schematic block diagram illustrating an embodiment of a network device;

DETAILED DESCRIPTION

Figure 1:
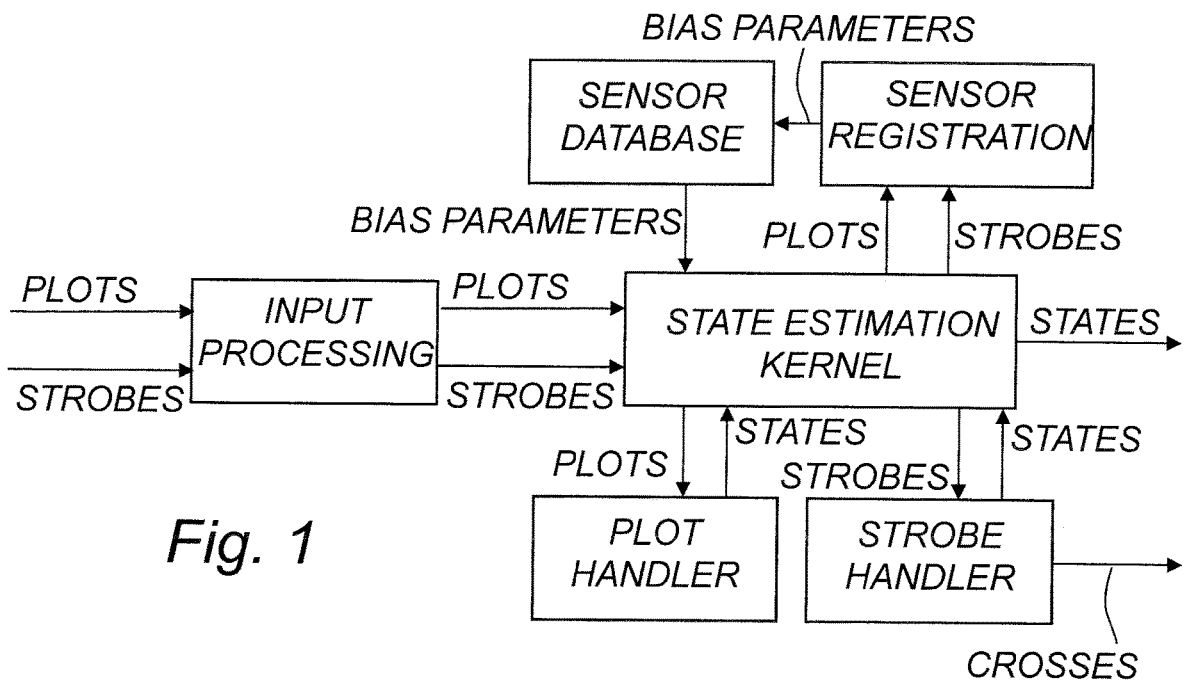
FIG. 1 is an example of a typical moving object kinematic state estimation system.

Throughout the drawings, the same reference designations are used for similar or corresponding elements.

In order to identify and possibly control UEs belonging to e.g. drones, it would be convenient to have access to a kinematic state estimation of potential UEs. Furthermore, since a wireless communication network is available, it would also be convenient if a node of the wireless communication network could accomplish this. UEs attached to drones could then possibly be distinguished from other UEs.

A kinematic state estimation of a device is in the present disclosure intended to be an estimation of signals defining a present position of the device as well as estimations of time derivatives of such a position. In other words, a kinematic state is to be understood as (an estimate of) the place where a device is situated, and which velocities the device has and preferably also its acceleration. A kinematic state is valid for a certain time instant.

However, there is no range measurement principle available in prior art, that allows ranges, from multiple gNBs or eNBs to a UE, to be obtained by a single gNB or eNB. Also, there is no signaling defined in prior art wireless specifications that allows measured ranges, from multiple gNBs or eNBs to a UE, to be aggregated in a single gNB or eNB.

In the following gNBs are used as an example for the description, however, the here presented technology is equally applicable also to e.g. the LTE cellular system, as obtained by replacing gNBs by eNBs.

Furthermore, there is no UE kinematic state estimation technology available in prior art that is able to fuse e.g. range-only information from multiple gNBs. This generally leads to poor altitude and altitude velocity estimates caused by the poor vertical geometry of normal base station antenna positions.

Moreover, there is no signaling functionality, in e.g. the present $3^{rd}$ Generation Partnership Project (3GPP) NR wireless standards, that allow distribution of UE kinematic state estimates and related, derived information, to the Radio Access Network (RAN) gNB nodes, other Core Network (CN) nodes or other relevant bodies.

The present technology thus presents novel kinematic state estimation techniques mainly related to measurement techniques to obtain range rates and ranges with respect to multiple base stations. The estimation techniques are applied to obtain an object kinematic state estimation system using the available range rate and range information. The resulting kinematic state estimates may be further used by a network node in different aspect.

The present technology requires a range rate measurement principle, with associated signaling allowing high accuracy, and measurement of range rates between multiple base stations and a UE, possibly connected to a drone. The present technology also requires a range measurement principle, with associated signaling, and measurement of ranges between multiple base stations and a UE, possibly connected to a drone.

A node architecture of the UE kinematic state estimation system may reside in, or be closely related to, the evolved Node B (eNB)/gNB, or in an external node.

However, for a better understanding of the proposed technology, it may be useful to begin with a brief overview of some general aspects of kinematic state estimation of moving objects and range measurements.

The technical field of moving object kinematic state estimation is, as such, mature today, with many operational systems worldwide. See for example any of the many available textbooks on the subject. One example block-diagram of a so-called multi-sensor kinematic state estimation system is depicted in FIG. 1.

The operation of this particular system can be briefly explained as follows. Measurements consisting of strobes and plots are first collected from the sensors attached to the moving object estimation system. Strobes are angle-only measurements and plots are Cartesian position measurements. The plots and strobes are sent to an input processing unit for association with existing three-dimensional kinematic state estimates. Association is the process of determining which measurements that belong to each kinematic state estimate.

The association is performed in the measurement space of each sensor, i.e. the kinematic state estimates, which typically reside in an earth tangential Cartesian coordinate system, are transformed to the measurement space of each sensor. Associated data then update kinematic state estimates in a kinematic state estimation kernel, typically with Kalman filtering techniques, as discussed further below. Plots and strobes that are not associated may originate from new objects and they are sent to the plot handler or the strobe handler for initiation of new kinematic state estimates. Crosses are pairs of strobes tentatively associated with new objects. Plots and strobes that are associated to high quality estimates are also used for computation of sensor bias parameters in the sensor registration block. This sensor registration is not needed in the present invention, but the known techniques may be combined with the current presented ideas for further enhancement.

If such a kinematic state estimation technique is implemented in a wireless communication system, some simplifications may be implemented. In a wireless communication system, each UE has a unique ID when attached to the cellular system. This means that the above described association process is not needed. Moreover, the advanced kinematic state initiation is not generally needed in the wireless communication system, but the known techniques may be combined with the technology presented here for further enhancement.

In summary, the novel UE kinematic state estimation techniques disclosed in the present disclosure are therefore mainly related to the measurement techniques to obtain ranges and range rates of UEs with respect to multiple base stations, together with the estimation techniques applied to obtain a UE kinematic state estimation system using the available information.

There are many known methods for estimation when multiple dynamic modes describe the behavior of an object, whose kinematic state is estimated.

A first and most general way of performing such estimation would be to depend on the joint probability distribution of the objects kinematic state. The propagation of this kinematic state forward in time is known in prior art to be governed by the so-called Fokker-Planck partial differential equation. The measurement processing is performed by a multi-dimensional integration, to obtain the posterior probability kinematic state distribution from the likelihood of the measurement and the prior probability distribution. This process is known under the name Bayesian inference. It is, however, immensely more computationally complex and memory intensive than the solution disclosed further below. In passing it can be mentioned that Bayesian inference is today approximated by so-called particle filters, in which the probability density functions are discretized in terms of individual "particles". Since particle filtering is still immensely more complex than the disclosed solution, the details are not discussed further in detail here.

At the other complexity extreme, each mode can be modeled separately and also estimated separately. Then ad hoc logic may be used to select the movement mode. Traditional kinematic state estimation for e.g. air vehicles was designed in that way. One movement mode was assumed to be constant velocity movement, i.e. straight line movement, and the other movement mode was a maneuver mode, modeled by a leaky constant velocity movement that responded to measurements with much higher agility than the constant velocity mode. Finally, a maneuver detector was used to choose the maneuver filter in case that was deemed to match measurements better. After the maneuver was terminated a re-initialized constant velocity movement mode was used for kinematic state estimation. This approach was robust but suffered from difficulties in the selection of threshold values for the maneuver detector.

A more systematic approach to the kinematic state estimation problem at hand is offered by the interacting-multiple-model (IMM) filter that was discovered about 30 years ago.

The IMM algorithm assumes that the system behaves according to one of a finite number of models which is one of several modes. These models can differ in noise levels or their structure, such as different kinematic state dimensions and unknown inputs. In the IMM approach, at time k the kinematic state estimate is computed under each possible model using r filters, with each filter using a different combination of the previous model-conditioned estimates—mixed initial conditions.

Figure 2:
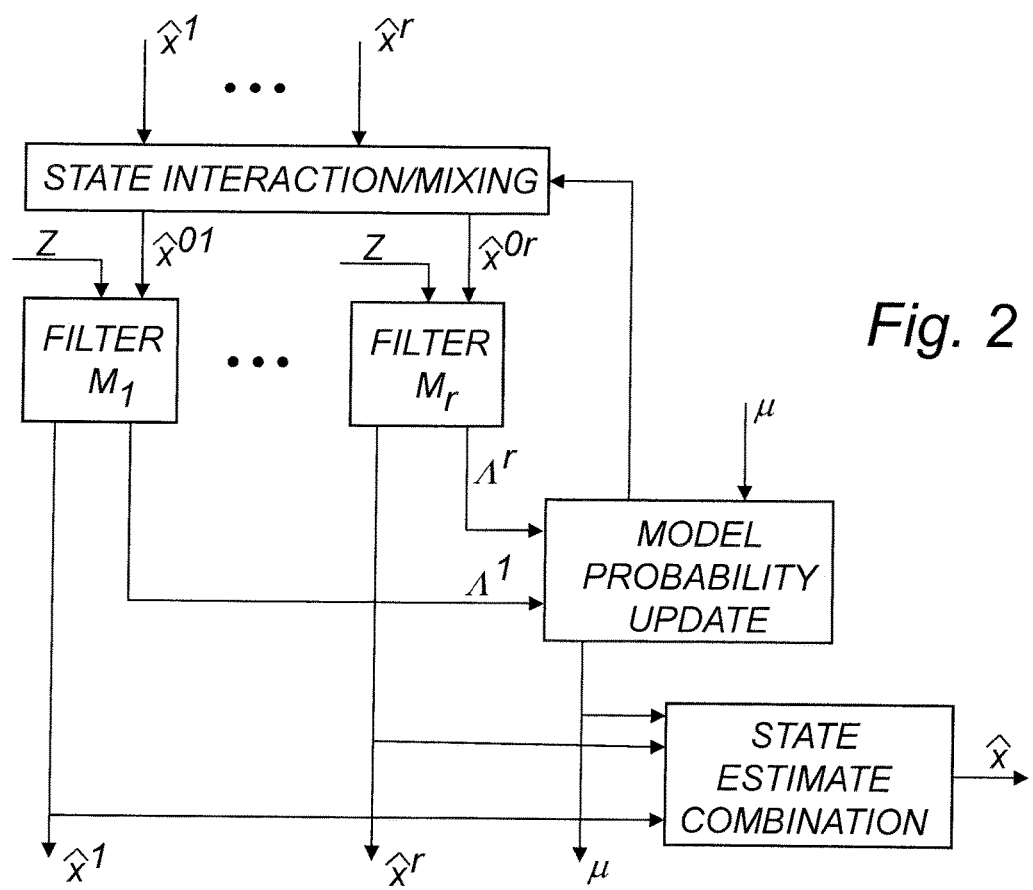
FIG. 2 is a block diagram of a typical example of an interacting-multiple-model algorithm.

FIG. 2 describes one cycle of the typical IMM algorithm, which consists of r interacting filters operating in parallel. The IMM algorithm is described more in detail in Appendix A.

To set up an IMM filter, three main choices need to be made. First, the movement modes have to be defined. Secondly, the transition probabilities between the movement modes have to be defined. Finally, the initial conditions of the filters have to be selected.

For each movement mode, this amounts to the definition of a kinematic state space model, i.e., one vector difference equation that defines the dynamics, and another static vector equation that defines the measurement relation, by mapping kinematic states to the measurements. In addition, the inaccuracies of the measurement equation and the dynamic kinematic state model needs to be given in terms of the covariance matrices of the uncertainties.

The second choice describes, in terms of a hidden Markov model, how the modes interact, this being expressed in terms of the probabilities of a mode transition of the estimated object, between two discrete instances of time.

The third choice is typically made in terms of the expected initial kinematic state and covariance of each model.

All these choices are typically specific for the actual implementation of the IMM and are thus more or less unique for each new implementation.

For each filter $M_j$, j=1, . . . , r, a nonlinear Extended Kalman filter (EKF) is typically used. EKF is based on linear approximations of the nonlinear system. It can be used to estimate the kinematic state of a discrete-time dynamic system described by a vector difference equation with additive white Gaussian noise that models unpredictable disturbances.

Figure 3:
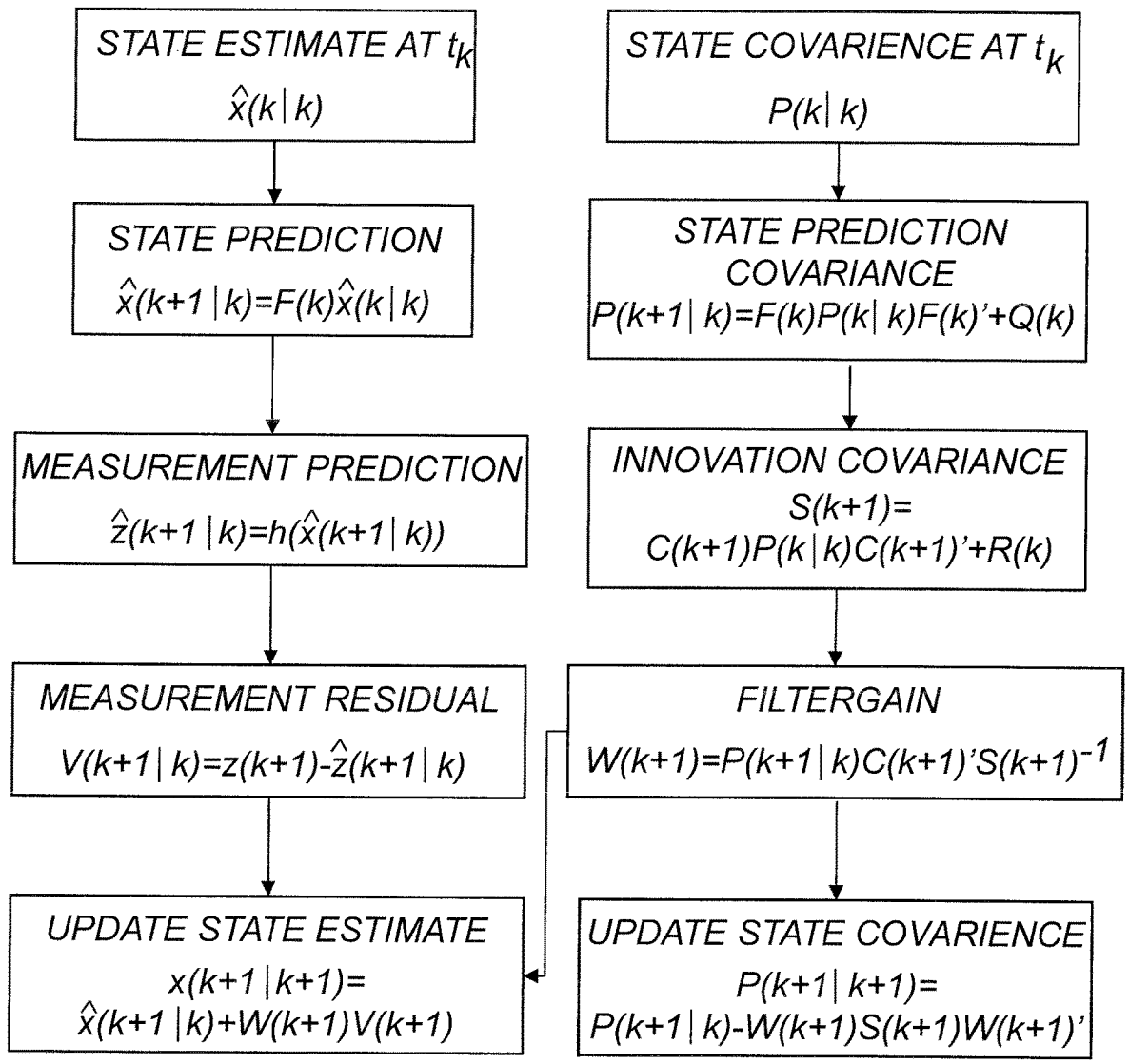
FIG. 3 is an illustration of one cycle of an example of a kinematic state estimation of a linear system with nonlinear measurement.

A flowchart of a typical EKF filter is shown in FIG. 3, and the EKF is described more in detail in Appendix B.

Figure 4:
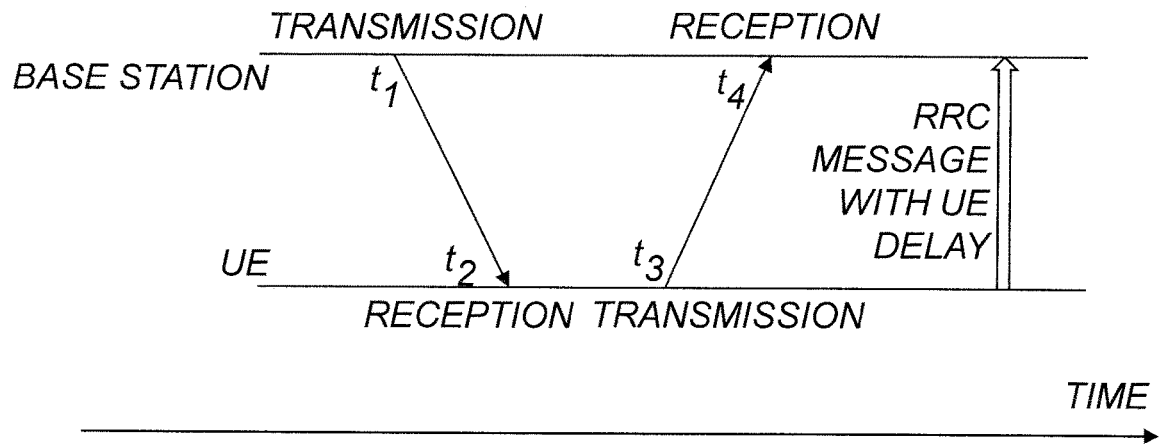
FIG. 4 illustrates the principle of round trip time measurements.

Range measurements, i.e. measurements of the distance between a base station and a UE, are possible to perform within wireless communication systems. There are several possibilities for range measurement. One way is to measure the travel time of radio waves to/from a base station and a UE. One alternative is then to measure the travel time of radio waves from a base station to a UE and back, i.e. a round-trip-time (RTT) measurement. Given the round trip time measurement, the range follows as:

$$R = c\frac{RTT}{2}, \quad (1)$$

where c denotes the speed of light. The principle of the RTT measurement is illustrated in FIG. 4. A base station transmits a signal at a time instant $t_1$. The signal propagates to the UE, which receives the signal at a time instant $t_2$. The UE replies with a reply signal, which is transmitted at a time instant $t_3$. The reply signal is received in the base station at a time instant $t_4$. The UE keeps track on the delay, UE RxTx, between the reception of the first signal and the transmission of the reply signal and signals this delay time to the base station, typically in a radio resource protocol (RRC) message. The UE RxTx is measured in the UE as:

$$\text{UE RxTx}=t_3-t_2 \quad (2)$$

At the base station side, the true RTT time can then be obtained as:

$$\text{RTT}=t_4-t_1-\text{UE RxTx}. \quad (3)$$

It can be noted that the main contribution of the inaccuracy of the measurement originates from the two reception processes in the UE and the base station. The theoretical inaccuracy of one such measurement is, in free space propagation, inversely proportional to the measurement bandwidth, as:

$$\Delta t \geq \frac{1}{4\pi}\frac{1}{\Delta f}. \quad (4)$$

This means that in case the measurement bandwidth is for example 30 MHz, then the best time inaccuracy that is possible is 2.65 ns which corresponds to a little less than 1 m, corresponding to a 1 sigma value, i.e. equal to a standard deviation. Since two independent measurement processes are used for RTT a 40 MHz measurement bandwidth would result in a combined RTT measurement inaccuracy of about 1 m.

The information from an RTT measurement therefore provides useful data that may be used e.g. for kinematic state estimations. However, a severe limitation in at least the present communication systems is that such RTT measurement information cannot readily be shared between different nodes. In other words, an RTT measurement with the own base station as measurement point is easily performed and corresponding range measures are available in the own base station. However, to achieve a kinematic state estimation, also measurements from other measurement positions are required.

The pathloss of the signal is a significant measurement in the LTE 4G network. Various propagation models are used for prediction of pathloss. Most of the empirical models take into account dependence of pathloss on carrier frequency, height of the transmitter and receiving antenna and parameters of propagation in the environment.

A Log-distance model may be used to predict the pathloss for a wide range of conditions, including both Line-of-Sight (LOS) and Non-Line-of-Sight (NLOS) scenarios. The model is:

$$PL = PL(d_0) + 10n\,\log_{10}\!\left(\frac{d}{d_0}\right) + X_\sigma, \quad (5)$$

where PL(d₀) is the pathloss at reference distance $d_0$ and it is defined as:

$$PL(d_0) = 20 \log_{10}\left(\frac{4\pi d_0}{\lambda}\right), \quad (6)$$

where $d_0=100$ m, d is the distance between transmitter and receiver, n is the pathloss exponent and $X_\sigma$ is the zero-mean Gaussian distributed random variable in dB with standard deviation $\sigma$ also in dB, and $\lambda$ is wavelength in m.

The Hata model is valid for microwave frequencies from 150 to 1500 MHz by analyzing Okumura's propagation curves. The pathloss is given as:

$$PL=46.3+33.9 \log_{10}(f)-13.82 \log_{10}(h_t)-\alpha(h_r)+(44.9-6.55 \log_{10}(h_t))\log_{10} d+c_m \quad (7)$$

where f is the frequency im [MHz], d is the distance between transmitter and receiver in [km], $h_t$ is the transmitter antenna height in [m]. the parameter $\alpha(h_r)$ is set according to the environment. For an urban environment the definition is:

$$\alpha(h_r)=3.20(\log_{10}(11.75h_r))^2-4.97 \text{ [dB]}, \quad (8)$$

where $h_r$ is the receiver antenna height in m. The parameter $c_m$ has different values for different environments, e.g. 0 dB for sub-urban and rural environments and 3 dB for urban areas.

Ericsson has developed a model that is a modified Okumura-Hata model to allow room for parameter changes according to the particular propagation environment. Pathloss according to this model is defined as:

$$PL=\alpha_0+\alpha_1 \log_{10}(d)+\alpha_2 \log_{10}(h_{bs})+\alpha_3 \log_{10}(h_{bs}) \log_{10}(d)-3.2(\log_{10}(11.75h_{ms}))^2+g(f), \quad (9)$$

where g(f) is:

$$g(f)=44.49 \log_{10}(f)-4.78(\log_{10}(f))^2, \quad (10)$$

with f is the frequency in [MHz], d is the distance between base station and the mobile station in [km], $h_{bs}$ is the base station antenna height and $h_{ms}$ is the mobile station antenna height in [m]. the values for parameters $\alpha_0$, $\alpha_1$, $\alpha_2$ and $\alpha_3$ are given in Table 1.

TABLE 1

Parameter values of Ericsson pathloss model

| Type of terrain | $\alpha_0$ | $\alpha_1$ | $\alpha_2$ | $\alpha_3$ |
|---|---|---|---|---|
| Urban | 36.2 | 30.2 | −12 | 0.1 |
| Suburban | 43.2 | 68.93 | −12 | 0.1 |
| Rural | 45.95 | 100.6 | −12 | 0.1 |

The main disadvantage of using path loss for defining a range is that the accuracy is relatively low, at least compared to many other range-measuring methods, e.g. RTT. The accuracy of the path-loss based range measurements is generally not sufficient to be used as the sole measurement type of a kinematic state estimation. The main advantage, on the other hand, is that the path-loss information is easily spread also through existing communication network nodes.

RTT measurements and path loss measurements are examples of range measurements, i.e. measurements that define a distance between a UE and a range measuring position. There are also other types of range measurements which can be utilized in an analogous way as described here below.

Besides range measurements, there are also range rate measurements. Range rate measurement data define a change rate of a distance between a UE and a range rate measuring position. Such data can be obtained by monitoring the change of range measurements with time. However, such differentiation of the range measurements wrt time introduces inaccuracies e.g. depending on the intermittent nature of the range measurements. Furthermore, the accuracy of such calculated range rate measurements will suffer from at least the same inaccuracies as the original range measurements.

It is therefore more convenient to measure the range rate directly. One such method, giving direct measurements of range rates is Doppler measurements.

Doppler measurements are readily available in the wireless systems, at least for the serving cell. Briefly, the Doppler frequency is related to the speed by which a user approaches a radio source as:

$$f_D = \frac{v}{c}f_c, \quad (11)$$

where $f_D$ is the Doppler frequency, v is the (departing) velocity of the UE wrt the base station, c is the speed of light and $f_c$ is the carrier frequency.

The Doppler measurement can be obtained in several ways: The best approach is probably to use the Fourier transformations that is done when OFDM reception is performed in 4G and 5G cellular systems. The Fourier transform pair:

$$e^{iw_0 t}f(t) \leftrightarrow F(j(w-w_0)) \quad (12)$$

can then be exploited in the uplink to compare the phase shift between pilot signals on say two OFDM symbols after each other. This also allows for multi-base station Doppler measurement.

In LTE, the PUCCH channel needs to be used for this purpose, while in NR the PUCCH channel and sounding reference signals (SRSs) may be used, since in NR up to 4 adjacent symbols may be scheduled as SRS.

However, Doppler measurement cannot as the sole information source be used for kinematic state estimations, since no information about the actual position is available at any time. A kinematic state estimation based on Doppler measurements therefore has to be combined with e.g. a start position value to be used and preferably also subsequent positions to avoid drifts in the kinematic state estimation routines.

A solution according to the technology presented here is to base the kinematic state estimation on range rate measurements, such as e.g. Doppler measurements, but in combination with range measurements, such as e.g. RTT measurements or path loss measurements. Even if these range measurements are not available for all base stations or is not, as such, accurate enough, this combining will give the range-rate-based kinematic state estimation the required range information in order to be operable.

Furthermore, a solution according to the here presented technology preferably comprises an estimation method that is adapted by a novel movement modeling suitable for drone estimation. To be able to accurately estimate the movement state of a UE connected to a drone, it is first realized that drones fly in very specific ways, e.g. hovering. These modes of movement thus preferably need to be reflected by the optimal estimator applied for measurement processing. Thus, the solution has to provide a new UE kinematic state estimation technology that handles the unique drone movement mode of hovering, at the same time as enabling handling of normal flight modes like straight line motion and maneuvering.

Also, novel UE kinematic state estimation algorithms, fusing the available multi-base-station range measurements and movement model information, are provided.

Figure 5:
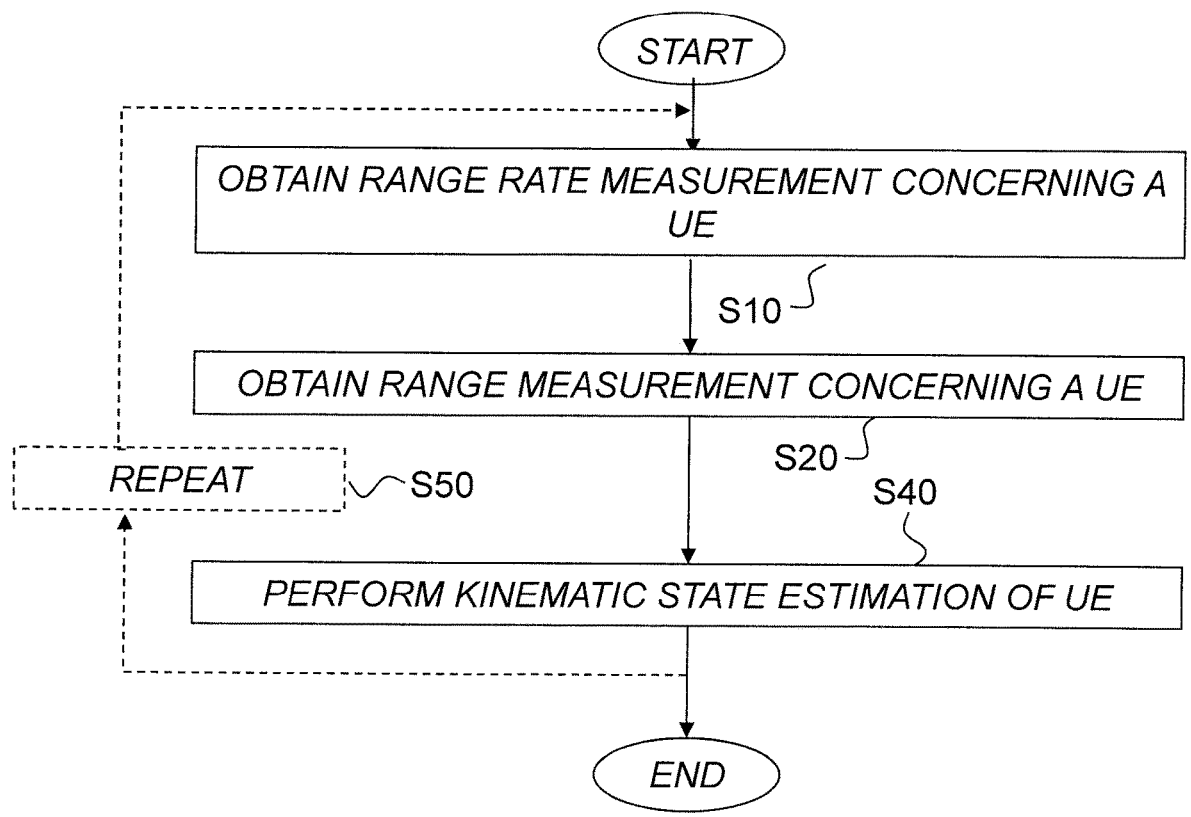
FIG. 5 is a schematic flow diagram illustrating steps of an embodiment of a method for kinematic state estimation of a UE connected to a wireless communication network.

FIG. 5 is a schematic flow diagram illustrating steps of an embodiment of a method for kinematic state estimation of a UE connected to a wireless communication network. In step S10, range rate measurement data, defining a change rate of a distance between the UE and a range rate measuring position, is obtained. This obtaining of range rate measurement data may comprise reception of range rate measurement data from base stations or other nodes performing the measurements, possibly via intermediate nodes. The intermediate nodes may e.g. compile range rate measurement data from several base stations. The obtaining step S10 may also comprise performing a range rate measurement concerning the UE by the node in which the method is implemented, e.g. if that node is a base station.

Thus, in one embodiment, the step of obtaining range rate measurement data comprises receiving the range rate measurement data from another node.

In one embodiment, the step of obtaining range rate measurement data comprises performing a range rate measurement concerning the UE.

The two above embodiments can also be combined.

In a preferred embodiment, the range rate measurement data comprises data of Doppler measurements. As mentioned above, Doppler measurements are readily available in communication systems of today and are typically performed with an excellent accuracy.

The range rate measurement data can be presented in different forms. In one embodiment, the range rate measurement data comprises a value of a velocity of the UE in a direction away from the range rate measuring position. In other words, the velocity is expressed explicitly.

In another embodiment, the range rate measurement data instead comprises a value of a Doppler frequency or a Doppler frequency shift for the UE with respect to the range rate measuring position. This Doppler frequency or Doppler frequency shift is an implicit measure of the velocity and the velocity can easily be calculated from these quantities.

In step S20, range measurement data, defining a distance between the UE and a range measuring position, is obtained. This obtaining of range measurement data may comprise reception of range measurement data from base stations or other nodes performing the measurements, possibly via intermediate nodes. The intermediate nodes may e.g. compile range measurement data from several base stations. The obtaining step S20 may also comprise performing a range measurement concerning the UE by the node in which the method is implemented, e.g. if that node is a base station.

Thus, in one embodiment, the step of obtaining range measurement data comprises receiving the range measurement data from another node.

In one embodiment, the step of obtaining range measurement data comprises performing a range measurement concerning the UE.

The two above embodiments can also be combined.

In a preferred embodiment, the range measurement data comprises data based on a propagation time measurement or data based on a power measurement.

In one embodiment, the range measurement data comprises data associated with a path loss measurement. As mentioned above, path loss measurements are readily available in communication systems of today and are easily communicated between different nodes.

In another embodiment, the range measurement data comprises data associated with a timing advance measurement or an RTT measurement. The RTT measurements are described above and are standard measurements within many communication systems and the accuracy is good. However, there are no standardized routines to share the RTT measurements between nodes today, which reduces the possibilities to use the information in neighbouring nodes. Timing advance measurements are also standard options in communications systems of today. Also here, the possibilities to share the information between nodes are limited.

The range measurement data can be presented in different forms. In one embodiment, the range measurement data comprises a value of a range between the UE and the range measuring position. In other words, the range is expressed explicitly.

In another embodiment, where path loss measurements are used, the range measurement data comprises a path loss value and/or a transmitted power and a received power. These power-related quantities are implicit measures of the range and the range can therefore easily be calculated from these quantities.

In another embodiment, where propagation time measurements are used, the range measurement data comprises at least one of:
 a value of a one-way propagation time for a radio signal between the UE and the range measuring position or between the range measuring position and the UE,
 a value of an RTT for radio signals forth and back between the UE and the range measuring position, and
 a time stamp for transmission of a downlink signal, a time stamp for reception of an uplink signal triggered by the downlink signal and a value of a round trip time delay in the UE. These time-related quantities are implicit measures of the range and the range can therefore easily be calculated from these quantities.

In one embodiment, at least one of the range rate measurement and the range measurement is performed by a base station.

In step S40, a kinematic state estimation of the UE is performed based on at least the range rate measurement data and the range measurement data. The step S40 comprises an interacting-multiple-model filtering comprising three interacting models. The interacting-multiple-model filtering comprises a three-dimensional constant velocity movement Wiener process, a three-dimensional constant acceleration movement Wiener process, and a three-dimensional constant position Wiener process.

The kinematic state estimation is thus performed based on two types of basic measurement; range rate and range measurements. It is of course possible in some embodiments to perform each update of the kinematic state estimation in dependence of both these types, if these different measurements were performed at the same time.

The measurement information comprises range rate data and range data. Information accompanying the measurement information may further comprise a time at which the range-related measurement was performed. This informs the about the time of the measurements.

To this end, the method may further comprise a step of obtaining a range-rate time, defining when the range rate measurement was performed, and obtaining a range time, defining when the range measurement was performed.

In one embodiment, if the range-rate time and the range time agrees, i.e. if the range-rate time is equal to the range time, the step S40 of performing a kinematic state estimation can be performed as a combined estimation based on the range rate measurement data as well as the range measurement data.

If the range-rate time and the range time are not equal, a simultaneous estimation cannot be assumed, and the step S40 of performing a kinematic state estimation is then preferably performed in two part steps; one for performing a kinematic state estimation based on the range rate measurement data and one for performing a kinematic state estimation based on the range measurement data.

In one embodiment, the approach of performing separate kinematic estimations for the different kinds of measurement can be extended to be valid for all cases, even when the measurements are essentially simultaneous.

In a preferred embodiment, as indicated by step S50, the method for kinematic state estimation comprises repeating at least one of the step S10 of obtaining range rate measurement data and the step S20 of obtaining range measurement data, as well as the step S40 of performing a kinematic state estimation for additional measurements concerning the UE.

The repeating of step S50 may be performed for measurements performed by different nodes.

The repeating of step S50 may be performed for non-synchronized measurements.

Furthermore, the information accompanying the measurement may also comprise an identity of the UE, so that an association between UE and measurements easily can be established, distinguishing the data from data associated with other UEs.

However, the identity of the concerned UE can also be obtained in other ways within the communication network.

In one embodiment, the method for kinematic state estimation comprises the further step of obtaining an identity of the UE.

The measuring position in the present disclosure is to be understood as the position relative to which the range rate-related or range-related measurement, respectively, of the UE is performed. It can also be different from the node (which also can be the UE) performing or reporting the actual measurement. This position is thus typically an origin of a radio signal used for measuring purposes, e.g. in an RTT measurement, a path loss measurement or a signal on which Doppler measurements are performed. The measuring position can be e.g. the position of a base station, or any other network node.

Also, the information accompanying the measurement may comprise data enabling determination of a measuring position. In other words, one embodiment of the method for kinematic state estimation comprises the further steps of obtaining data enabling determination of the range rate measuring position, and obtaining data enabling determination of the range measuring position.

This data enabling determination of a measuring position may comprise direct information about the measuring position, e.g. in form of Cartesian coordinates in an earth model or any other type of coordinates.

In other words, at least one of the data enabling determination of the range rate measuring position and the data enabling determination of the range measuring position comprises position data of the range rate measuring position or the range measuring position, respectively.

The data enabling determination of a measuring position may alternatively comprise an identity of the node that performed the range-related measurement. This identity of the node that performed the range-related measurement can then be translated into a position. A pre-provided data storage having relations between node IDs and position stored in it can be used for this purpose. The ID of the node can then be used as an input to the data base, which responds by giving the corresponding position.

In other words, at least one of the data enabling determination of the range rate measuring position and the data enabling determination of the range measuring position comprises an identity of a node performing the range rate measurement or range measurement, respectively. An embodiment of the method for kinematic state estimation comprises the further step of retrieving a position of the node performing the range rate measurement or range measurement, respectively, from a data storage based on the identity of the node performing the range rate measurement or range measurement, respectively.

In step S40, a kinematic state estimation of the UE is performed based on the measurement information. Preferred embodiments of such kinematic state estimation are presented further below.

Preferably, as illustrated by step S50, the steps of obtaining information about range rate measurements S10, obtaining information about range measurements S20, and performing a kinematic state estimation S40 are repeated for additional measurements concerning the UE. Preferably, the repeating S3 is performed for measurements performed by different nodes.

As mentioned above, base stations, e.g. eNBs or gNBs, are well suited for performing range measurements. Thus, in a preferred embodiment, the range-related measurement is performed by a base station. Also, the entire method may be implemented in a base station. In other words, the method for kinematic state estimation of a UE is performed in a radio base station.

The method can of course also be performed for a multitude of UEs at the same time. In other words, in one embodiment, at least one of the steps of obtaining range rate measurement data and the step of obtaining range measurement data as well as the step of performing a kinematic state estimation are repeated for additional UEs. The different measurements can be distinguished by the provided identity of the UE accompanied to the measurement information.

In one embodiment, the step of performing a kinematic state estimation S40 comprises Extended Kalman Filtering.

Figure 6:
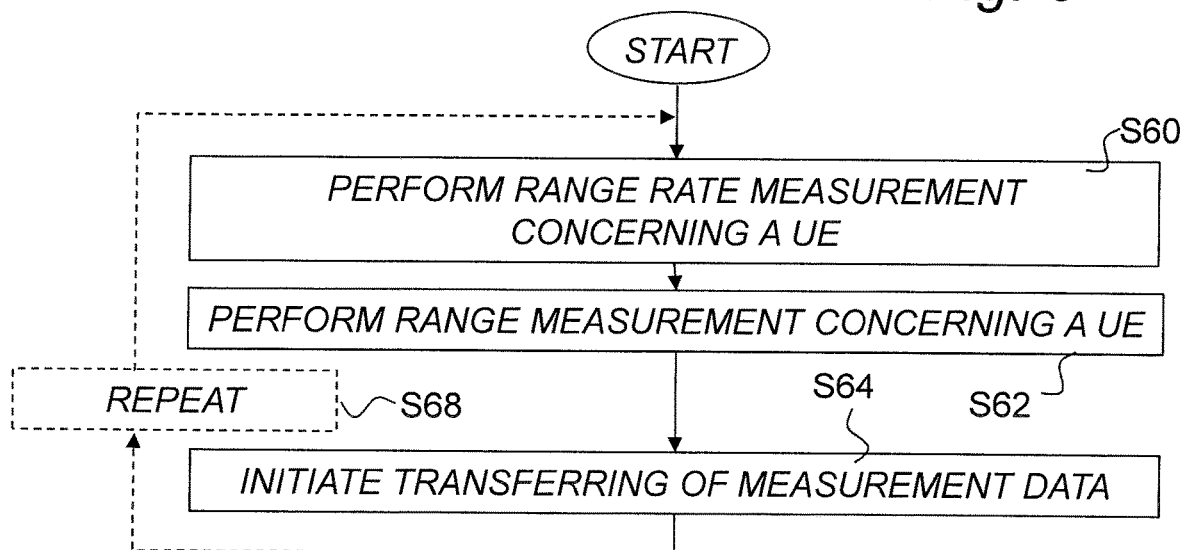
FIG. 6 is a schematic flow diagram illustrating steps of an embodiment of a method for assisting in kinematic state estimation of a UE connected to a wireless communication network.

FIG. 6 is a schematic flow diagram illustrating steps of an embodiment of a method for assisting in kinematic state estimation of a UE connected to a wireless communication network. In step S60, a range rate measurement concerning the UE is performed. This range rate measurement defines a change rate of a distance to the UE. This measurement can be performed according to any known range measurement procedures. In step S62, a range measurement concerning the UE is performed. The range measurement defines a distance to the UE. In step S64, a transferring of range rate measurement data and range measurement data to a kinematic state estimation node is initiated.

The measurement can depend on different kinds of measurement results, e.g. determinations of Doppler frequencies, receiving and transmitted power, transmission and reception times etc. The measurement can also comprise different computational actions, e.g. subtracting an Rx-Tx delay received from a UE from a determined difference between reception and transmission times, calculating a velocity from a Doppler frequency etc. In other words, the term measurement should be interpreted as the action of deriving data related to a range rate or a range between a measuring position and a UE.

In step S64, a transferring of measurement data to a kinematic state estimation node is initiated. The measurement data may also be accompanied by e.g. a time at which the range rate or range measurement was performed, an identity of the UE and data enabling determination of a measuring position.

Also here, in one embodiment, the data enabling determination of a measuring position comprises position data of the measuring position.

In another embodiment, the data enabling determination of a measuring position comprises an identity of a node performing the range-related measurement.

As indicated by step S68, this procedure may be repeated.

In a preferred embodiment, the steps of performing the range rate measurement S60, performing the range measurement S62 and initiating the transferring of measurement data S64 are repeated for additional measurements concerning the UE.

In one embodiment, the steps of performing the range rate measurement S60, performing the range measurement S62 and initiating the transferring of measurement data S64 are repeated for additional UEs.

As mentioned above, the range rate and range measurements can be of different kinds, and so the resulting data. A measuring unit may also process the results in different ways before transmitting it to a kinematic state estimator.

One alternative is that the measuring unit uses the achieved range rate or range measuring results to calculate a value of the actual velocity and distance, respectively. In other words, the provided measurement data may comprise a value of the velocity or distance, respectively, between the UE and the measuring position.

If UEs and base stations are well synchronized, direct one-way propagation time measurements may be performed as a base for range measurements. Alternatively, a one-way propagation time may be calculated from other measured quantities. Such a one-way propagation time is indeed a measure of a distance, using the speed of light as conversion factor.

However, as was indicated above, RTT measurements are feasible measurements used for achieving a range measure. The base station or other measuring node can compute a round trip time. This is indeed also a measure of a range. In other words, the provided measurement data may comprise e.g. a value of an RTT for radio signals forth and back between the UE and the measuring position.

In cases where the measuring unit itself do not have or is not willing to use computational resources for computing the actual RTT, also the part measurements can be used. The transformation of a time stamp for transmission of a downlink signal, a time stamp for reception of an uplink signal triggered by the downlink signal and a value of an RTT delay in the UE can be used for calculating a proper RTT or a range at any other node. In other words, the provided range measurement data may comprise a time stamp for transmission of a downlink signal, a time stamp for reception of an uplink signal triggered by the downlink signal and a value of an RTT delay in the UE.

The reasoning is the same also for e.g. path loss measurements. Here, the path loss measurements could be translated into a value of a distance, which is transferred. Alternatively, measures of received power and data regarding transmitted power can be used as data enabling a determination of a range.

In the case of range rate measurements, and in particular to Doppler measurements, the measured Doppler shifts could be converted into corresponding values of a velocity before being transferred to the kinematic state estimator. Alternatively, the raw measurement data or any intermediate calculated data could also be transferred, giving the kinematic state estimator the task to convert this data into range rate data.

In analogy with the discussion above, also the measurement data received by the node performing the actual kinematic state estimation can be in these different formats.

The measurement data is collected from a number of measuring positions and provided to a common UE kinematic state estimation process. In this collection process, the measurement data may pass different intermediate nodes. These intermediate nodes may just forward the information or they can compile the measurements data into another appearance e.g. to save transmission resources. The UE kinematic state estimation process may thus utilize measurement data that is provided in another form than the measurement data provided by the measurements.

Figure 7:
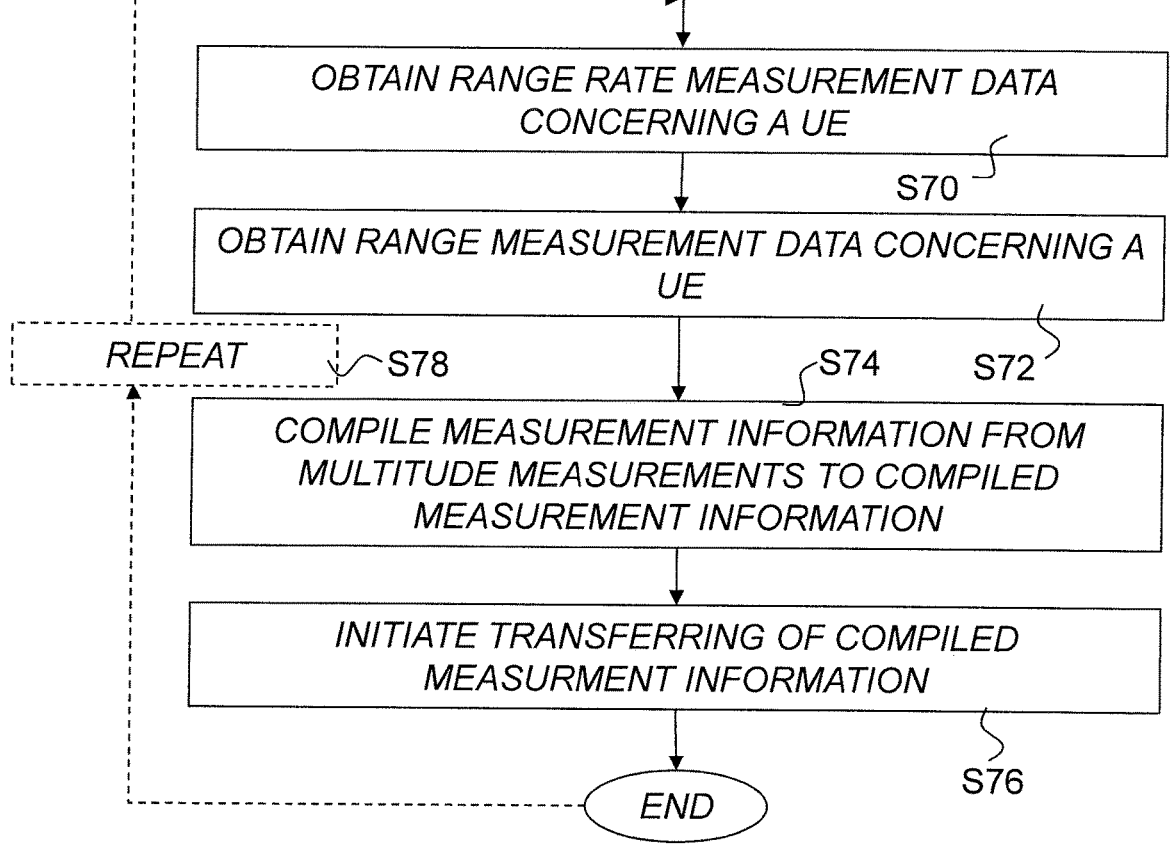
FIG. 7 is a schematic flow diagram illustrating steps of an embodiment of another method for assisting in kinematic state estimation of a UE connected to a wireless communication network.

FIG. 7 is a schematic flow diagram illustrating steps of an embodiment of a method for assisting in kinematic state estimation of UEs connected to a wireless communication network. In step S70, range rate measurement data related to a multitude of range rate related measurements concerning at least one UE is obtained. The range rate measurement data defines a change rate of a distance between the UE and a range rate measuring position. In step S72, range measurement data related to a multitude of range related measurements concerning at least one UE is obtained. The range measurement data defines a distance between the UE (10) and a range measuring position. As above, the measurement data may further be accompanied by times at which the range rate measurement or range measurement, respectively, was performed, an identity of the UE and data enabling determination of a measuring position. In step S74, the measurement information related to a multitude of range rate measurement data and a multitude of range measurement data is compiled into compiled measurement information. In step S76, a transferring of the compiled measurement information to a kinematic state estimation node is initiated.

Preferably, as indicated by step S24, the steps S21-S23 are repeated.

In one embodiment, the range rate measurement data comprises data of Doppler measurements.

In one embodiment, the range measurement data comprises data based on a power measurement.

In a further embodiment, the range measurement data comprises data associated with a path loss measurement.

In one embodiment, the step S70 of obtaining range rate measurement data and the step S72 of obtaining range measurement data comprise performing a range rate and performing a range measurement, respectively, concerning the UE.

In one embodiment, the step S70 of obtaining range rate measurement data and the step S72 of obtaining range measurement data comprise receiving measurement information from another node.

In a further embodiment, the range rate measurement data comprises a value of a velocity of the UE in a direction away from the range rate measuring position.

In further embodiment, the range rate measurement data comprises a value of a Doppler frequency or Doppler frequency shift for the UE with respect to the range rate measuring position.

In another further embodiment, the range measurement data comprises a value of a range between the UE and the range measuring position.

In one embodiment, the range measurement data comprises a path loss value and/or a transmitted power and a received power.

In one embodiment, the compiled measurement information comprises measurement data comprising a value of a velocity of the UE in a direction away from the range rate measuring position and a value of a range between the UE and the range rate measuring position.

In one embodiment, the compiled measurement information comprises measurement data comprising at least one of a value of a Doppler frequency or Doppler frequency shift for the UE with respect to the range rate measuring position and at least one of a path loss value and a transmitted power and a received power.

In one embodiment, the method is performed in a base station (20).

Figure 8:
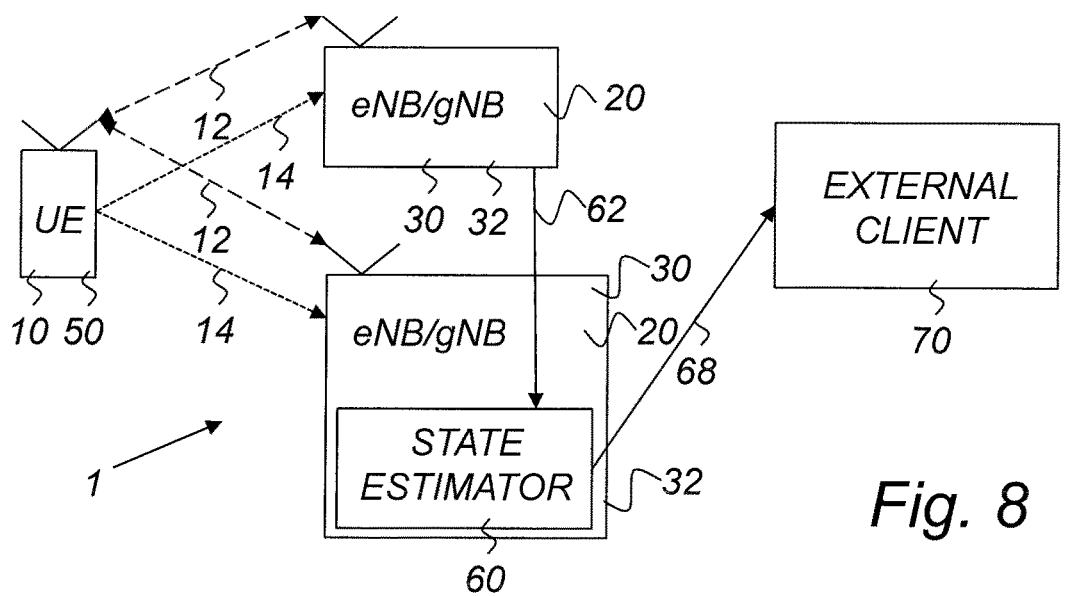
FIGS. 8-13 illustrate architectures for embodiments of systems for UE kinematic state estimation.

A number of new architecture aspects for drone kinematic state estimation functionality are possible. FIG. 8 shows an embodiment of a wireless communication system 1 where a UE kinematic state estimator 60 is included in a base station 20, e.g. an eNB/gNB 32. The wireless device 50, in this embodiment the UE 10, cooperates with a network node 30, in this embodiment an eNB/gNB 32, by transmitting signals 12 forth and back to establish an RTT, a path loss determination or a Doppler measurement. The UE 10 also sends a message comprising results of the measurements 14 to the eNB/gNB 32. The eNB/gNB comprising the UE kinematic state estimator measures its own RTT, path loss and Doppler frequency and receives measurement information 62 from the other eNB/gNB 32. In the illustration, only one other eNB/gNB 32 is illustrated, in order to simplify the reading of the drawings, however, as anyone skilled in the art understands, there are typically multiple neighboring eNBs/gNBs 32. The measurement information 62 may, as discussed above, comprise range rate values, range values, different levels of processed measurement data etc. However, the measurement information 62 may also only comprise the raw data, such as time stamps for transmission/reception, UERxTx measurements for the multiple neighbor eNBs/gNBs 32, measured received Doppler frequencies and then the kinematic state estimator 60 computes their ranges and range rates accordingly. The measurements are then used in the UE kinematic state estimator 60.

There may also be synchronization, time relation and/or setup information that is communicated between the eNBs/gNBs 32.

The UE kinematic state estimator now produces kinematic state estimate information, manifested in the estimated kinematic state vector. This information may be useful for example for interference mitigation, since drones create more interference at higher altitudes than ground based UEs. Therefore, new kinematic state estimate information 68 may be sent to an external client 70 for further use. The external client 70 may reside within the wireless communication system 1 or outside. This provision of new information may require 3GPP protocol extensions. The kinematic state estimate information 68 may e.g. be used to prevent UE penetration of restricted airspace. Such measures are discussed further below.

Figure 9:
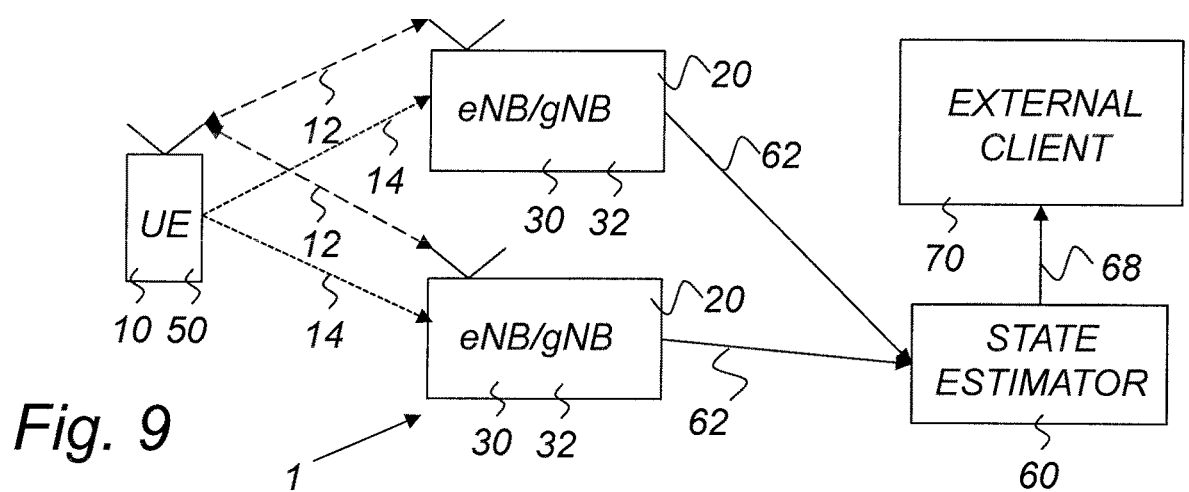

FIG. 9 shows an embodiment of a wireless communication system 1 where a UE kinematic state estimator 60 is provided externally with respect to the eNBs/gNBs 32. In this embodiment, the UE kinematic state estimator 60 receives measurement information 62 from all eNBs/gNBs 32.

Figure 10:
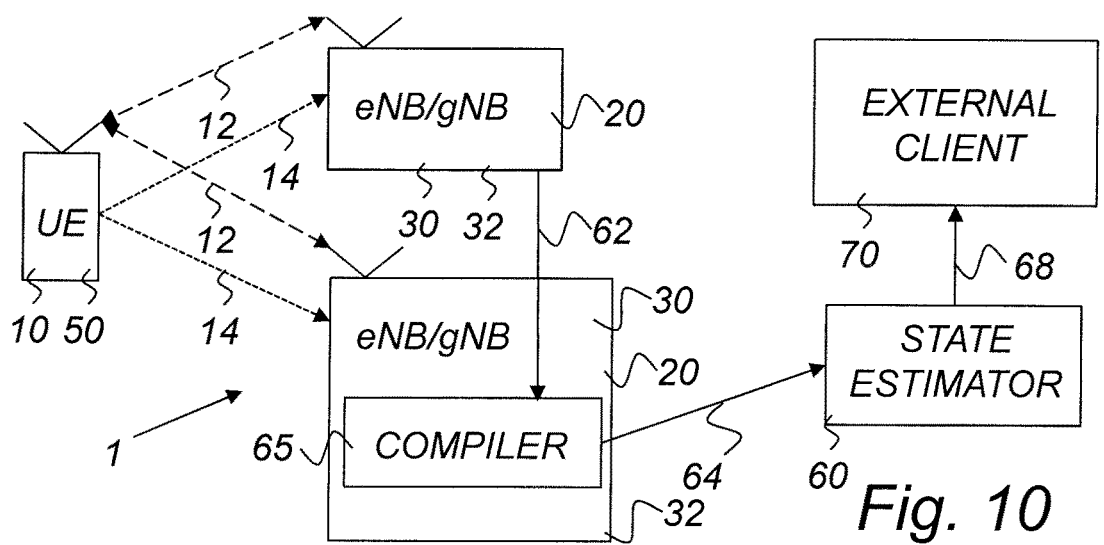

FIG. 10 shows an embodiment of a wireless communication system 1 where the UE kinematic state estimator 60 also is broken out from the eNB/gNB 32. However, one of the eNBs/gNBs 32 acts as a collecting node for the measurement information 62 from all eNBs/gNBs 32. A compiler 65 receives measurement information 62 from all eNBs/gNBs 32 and compiles the data into compiled measurement information 64, which is provided to the UE kinematic state estimator 60. For instance, if the measurement information 62 from all eNBs/gNBs 32 comprises the raw measurement data, such as experienced Doppler frequency shifts, received power, time stamps for transmission/reception and the UERxTx measurements, the compiler may perform the computation of the different RTTs, computed path losses and Doppler shifts and forward these types of data as compiled measurement information 64.

The measurement information 62 and the compiled measurements information 64 are in different embodiments signalled between different nodes in the wireless communication network.

Figure 11:
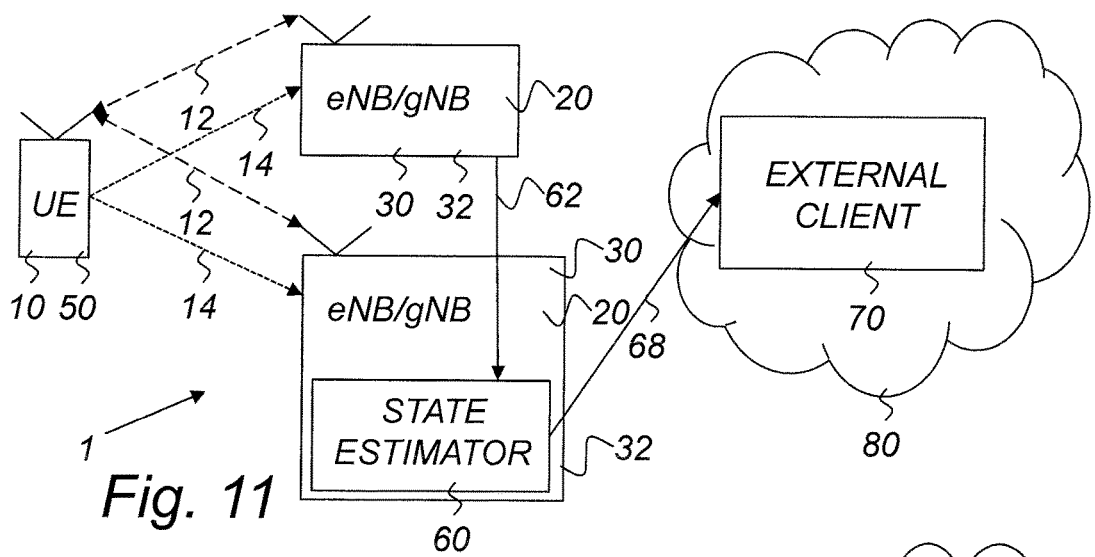
Figure 12:
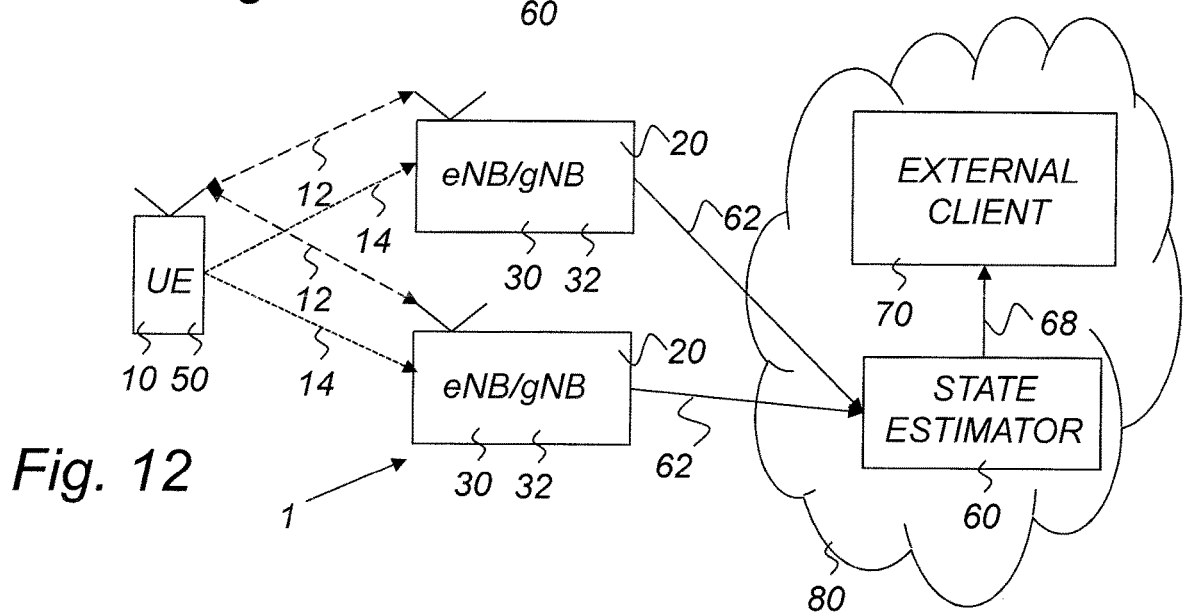
Figure 13:
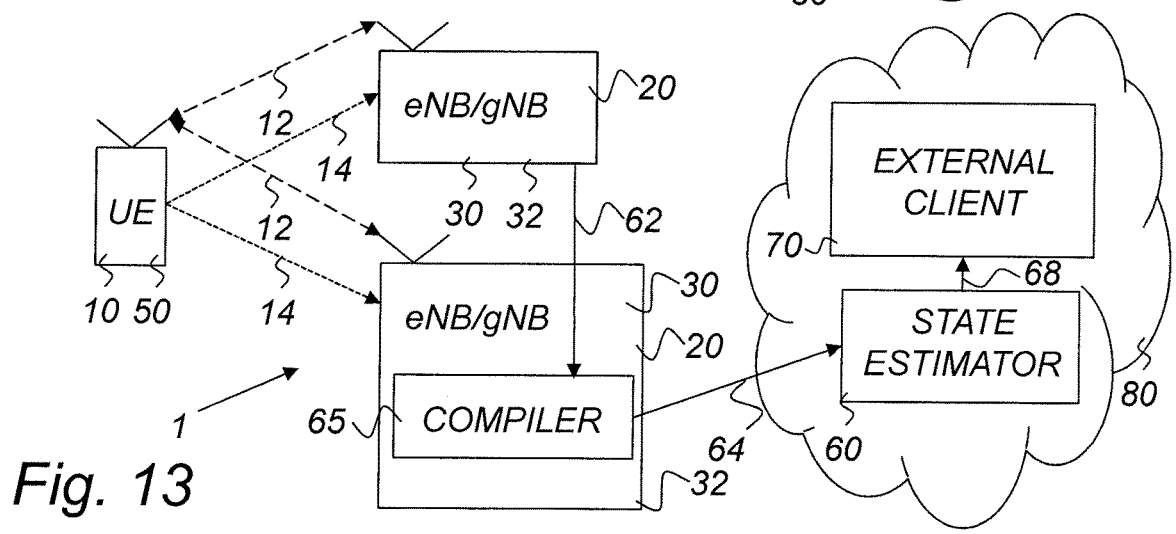

As will be discussed further below, different nodes or parts thereof may be provided in the cloud. FIG. 11 shows an embodiment of a wireless communication system 1, similar to the one in FIG. 8, however, with the external client 70 provided in the cloud 80. FIG. 12 shows an embodiment of a wireless communication system 1, similar to the one in FIG. 9, however, with both the UE kinematic state estimator 60 and the external client 70 provided in the cloud 80. FIG. 13 shows an embodiment of a wireless communication system 1, similar to the one in FIG. 10, also with both the UE kinematic state estimator 60 and the external client 70 provided in the cloud 80.

The different eNBs/gNBs performing the signaling and measurements of the range rates and ranges to the UEs are not necessarily synchronized. The measurements obtained from one eNB/gNB may therefore be performed at one time instant, whereas measurements from another eNB/gNB may be associated with another time instant. However, if the measurement data is accompanied by an indication of when the measurement actually was performed, the kinematic state estimation can handle such non-synchronized measurements.

Thus, in one embodiment, the repeating steps S50, S68 and S78 mentioned above are performed for non-synchronized measurements.

The kinematic state estimate information 68 would typically consist at least of a kinematic state estimate information identifier, a UE identity, the time when the kinematic state estimate information is valid, and an estimated kinematic state. The kinematic state would at least comprise a 3D position, but preferably also a 3D velocity. The information may also include ground altitude information, as will be discussed further below. Alternatively, the ground altitude information could already be subtracted from the kinematic state information to get the altitude above ground, signaled in the kinematic state estimate information. That would require an additional identifier stating if ground altitude information is subtracted or not.

In one aspect of the present ideas, a signal is provided, configured to be communicated within a wireless communication network. The signal represents kinematic state estimate information of a UE. The kinematic state estimate information comprises a kinematic state estimate information identifier, a UE identity, a time when the kinematic state estimate information is valid, and an estimated kinematic state of the UE. The estimated kinematic state comprises at least a three-dimensional position and preferably also a three-dimensional velocity.

Figure 14:
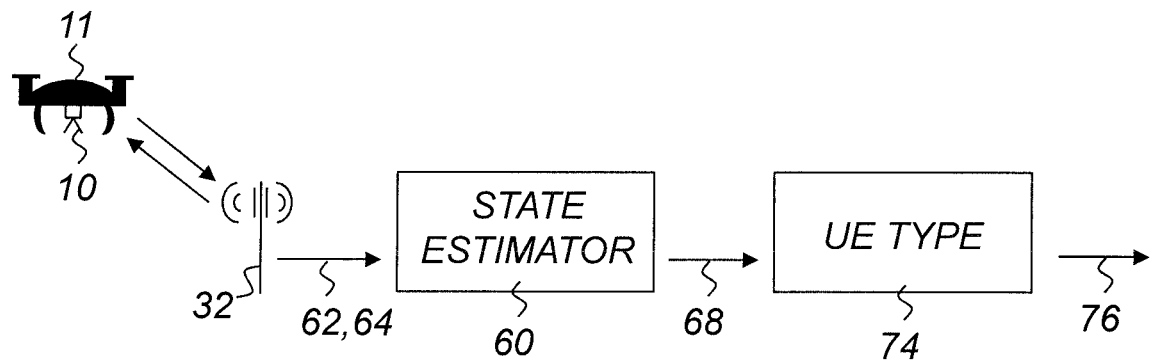
FIG. 14 illustrates a UE kinematic state estimation setup.

FIG. 14 illustrates the UE kinematic state estimation problem. A drone 11, comprising a UE 10 moves e.g. in a restricted area. The drone 11 communicates via base stations, e.g. eNBs/gNBs 32, which provides noisy measurements of the range rates and ranges between respective eNB/gNB 32 and the drone. The UE kinematic state estimator 60 uses noisy measurements, preferably utilizing IMM, to provide kinematic state estimations 68. A UE type unit 74 can analyze the kinematic state estimations 68 and by using knowledge of the characteristic movements of a drone 11, thereby determining that the UE 10 is likely to be attached to a drone 11. Different kinds of measures 76 can thus be performed.

As was indicated above, the use of IMM is a preferred way to effectuate the estimation. To this end, a new 3-mode drone movement model has been created. The following 3-mode model is believed to constitute a new combination of movement modes, adapted to the hovering movement that drones are capable of. The three models are a 3D constant velocity movement Wiener process, a 3D constant acceleration movement Wiener process, and a 3D constant position Wiener process. The notation "constant" allows for minor fluctuations, so that the first model really concerns an almost constant velocity movement, the second model really concerns an almost constant acceleration movement and the third model really concerns an almost hovering constant position movement.

The continuous time kinematic state space constant velocity model is described using the kinematic states:

$$x(t) = \begin{bmatrix} x_1 \\ x_2 \\ x_3 \\ \dot{x}_1 \\ \dot{x}_2 \\ \dot{x}_3 \end{bmatrix}, \quad (5)$$

where the subscript defines the Cartesian coordinate directions. The model is:

$$\dot{x}(t) = A_1 x(t) + B_1 \hat{v}(t), \quad (6)$$
with $$A_1 = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}, B_1 = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad (7)$$

The process noise covariance matrix is:

$$Q_{c_1} = \text{diag}([q_{11}\ q_{12}\ q_{13}]), \quad (8)$$

where $q_{11}$, $q_{12}$ and $q_{13}$ are the process noise variances.

The continuous time kinematic state space constant acceleration model is defined using the kinematic states:

$$x(t) = \begin{bmatrix} x_1 \\ x_2 \\ x_3 \\ \dot{x}_1 \\ \dot{x}_2 \\ \dot{x}_3 \\ \ddot{x}_1 \\ \ddot{x}_2 \\ \ddot{x}_3 \end{bmatrix}, \quad (9)$$

where the subscript defines the Cartesian coordinate directions. The model is:

$$\dot{x}(t) = A_2 x(t) + B_2 \hat{v}(t) \quad (10)$$

$$A_2 = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}, B_2 = \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad (11)$$

The process noise covariance matrix is $Q_{C_2}$.

The continuous time kinematic state space constant position hovering model is defined by the kinematic states:

$$x(t) = \begin{bmatrix} x_1 \\ x_2 \\ x_3 \end{bmatrix}, \quad (12)$$

where the subscript defines the Cartesian coordinate directions. The model is:

$$\dot{x}(t) = A_3 x(t) + B_3 \hat{v}(t) \quad (13)$$

$$A_3 = \begin{bmatrix} 0 & 0 & 0 \\ 0 & 0 & 0 \\ 0 & 0 & 0 \end{bmatrix}, B_3 = \begin{bmatrix} 1 & 0 & 0 \\ 0 & 1 & 0 \\ 0 & 0 & 0.001 \end{bmatrix}. \quad (14)$$

The process noise covariance is $Q_{C_3}$.

Another aspect of the new preferred IMM filtering process, disclosed here, is related to the physics of the drone movement. When the drone is in constant velocity movement, it cannot stop immediately, it rather brakes. This means that the sequence of mode transitions is from mode 1, over mode 2, to mode 3. The direct mode transmission from mode 1 to mode 3 is forbidden. This is reflected by new constraints in the mode transition probability matrix of the IMM filter, namely in:

$$p_{ij} = \begin{bmatrix} p_{11} & p_{12} & p_{13} \\ p_{21} & p_{22} & p_{23} \\ p_{31} & p_{32} & p_{33} \end{bmatrix}. \quad (15)$$

The new restrictions are selected as the following ones:

$$p_{13} \leq \varepsilon_{13}, \; p_{31} \leq \varepsilon_{31}. \quad (16)$$

Here $\varepsilon_{13}$ and $\varepsilon_{31}$ are both much smaller than 1.

A UE kinematic state estimation technology that restricts direct switching between a constant velocity movement and a hovering behavior is not believed to have been presented in prior art.

Thus, in one embodiment, the interacting-multiple-model filtering comprises a reduced switching probability between the three-dimensional constant velocity movement Wiener process and the three-dimensional constant position Wiener process. Preferably, the reduced switching probability between the three-dimensional constant velocity movement Wiener process and the three-dimensional constant position Wiener process is at least two orders of magnitude lower than for switching probabilities involving the three-dimensional constant acceleration movement Wiener process.

As stated above, there are several methods in prior art with which Doppler information can be obtained in multiple sites. Here it is disclosed how to exploit that information for enhances rogue drone state estimation. To do so, it is necessary to relate the measured Doppler frequency, to the estimated states in a measurement equation.

Denoting the Doppler frequency measured in site s and related quantities with a subscript s as above, leads to:

$$f_{D,s} = \frac{v_s}{c} f_c, \quad (17)$$

where $v_s$ denotes the speed with which the distance between node s and the UE (e.g. a suspected rogue drone) increases. Now some vector computations lead to:

$$v_s = \frac{(\hat{r} - r_s)}{\|\hat{r} - r_s\|} \cdot \dot{\hat{r}} = \frac{(\hat{x}_1 - x_{s,1})\hat{x}_4 + (\hat{x}_2 - x_{s,2})\hat{x}_5 + (\hat{x}_3 - x_{s,3})\hat{x}_6}{\sqrt{(\hat{x}_1 - x_{s,1})^2 + (\hat{x}_2 - x_{s,2})^2 + (\hat{x}_3 - x_{s,3})^2}}, \quad (18)$$

where $\hat{r}$ and $r_s$ are the estimated position vectors of the UE and node, from the origin of the coordinate system, and where $\dot{\hat{r}}$ is the range rate vector of the UE. The disclosed combined measurement equation for one Doppler measurement thus becomes:

$$h(\hat{x}) = \frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{\sqrt{(\hat{x}_1 - x_{s,1})^2 + (\hat{x}_2 - x_{s,2})^2 + (\hat{x}_3 - x_{s,3})^2}}. \quad (19)$$

This measurement equation is clearly irrelevant for the hovering mode. It needs to be applied to the two other modes only, skipping the update for the hovering mode. Several measurement equations are then straightforward to combine, by adding rows to the measurement matrix $h(\hat{x})$ of the EKF. It remains to compute the derivative of the measurement matrix. Exemplifying this computation for site s results in:

$$\frac{\partial h(\hat{x})}{\partial \hat{x}} = \left( \frac{\partial h}{\partial \hat{x}_1} \; \frac{\partial h}{\partial \hat{x}_2} \; \frac{\partial h}{\partial \hat{x}_3} \; \frac{\partial h}{\partial \hat{x}_4} \; \frac{\partial h}{\partial \hat{x}_5} \; \frac{\partial h}{\partial \hat{x}_6} \; 0 \; 0 \; 0 \right), \quad (20)$$

where $$\frac{\partial h}{\partial \hat{x}_1} = \frac{f_c}{c} \frac{\hat{x}_4}{\sqrt{(\hat{x}_1 - x_{s,1})^2 + (\hat{x}_2 - x_{s,2})^2 + (\hat{x}_3 - x_{s,3})^2}} - \frac{f_c}{c} \frac{(\hat{x}_1 - x_{s,1})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - \hat{x}_{s,1})^2 + (\hat{x}_2 - \hat{x}_{s,2})^2 + (\hat{x}_3 - \hat{x}_{s,3})^2\right)^{\frac{3}{2}}}, \quad (21)$$

$$\frac{\partial h}{\partial \hat{x}_2} = \frac{f_c}{c} \frac{\hat{x}_5}{\sqrt{(\hat{x}_1 - x_{s,1})^2 + (\hat{x}_2 - x_{s,2})^2 + (\hat{x}_3 - x_{s,3})^2}} - \frac{f_c}{c} \frac{(\hat{x}_2 - x_{s,2})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{s,1})^2 + (\hat{x}_2 - x_{s,2})^2 + (\hat{x}_3 - x_{s,3})^2\right)^{\frac{3}{2}}}, \quad (22)$$

$$\frac{\partial h}{\partial \hat{x}_3} = \frac{f_c}{c} \frac{\hat{x}_6}{\sqrt{(\hat{x}_1 - x_{s,1})^2 + (\hat{x}_2 - x_{s,2})^2 + (\hat{x}_3 - x_{s,3})^2}} - \frac{f_c}{c} \frac{(\hat{x}_3 - x_{s,3})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{s,1})^2 + (\hat{x}_2 - x_{s,2})^2 + (\hat{x}_3 - x_{s,3})^2\right)^{\frac{3}{2}}}, \quad (23)$$

$$\frac{\partial h}{\partial \hat{x}_4} = \frac{f_c}{c} \frac{(\hat{x}_1 - x_{s,1})}{\sqrt{(\hat{x}_1 - x_{s,1})^2 + (\hat{x}_2 - x_{s,2})^2 + (\hat{x}_3 - x_{s,3})^2}}, \quad (24)$$

$$\frac{\partial h}{\partial \hat{x}_5} = \frac{f_c}{c} \frac{(\hat{x}_2 - x_{s,2})}{\sqrt{(\hat{x}_1 - x_{s,1})^2 + (\hat{x}_2 - x_{s,2})^2 + (\hat{x}_3 - x_{s,3})^2}}, \quad (25)$$

$$\frac{\partial h}{\partial \hat{x}_6} = \frac{f_c}{c} \frac{(\hat{x}_3 - x_{s,3})}{\sqrt{(\hat{x}_1 - x_{s,1})^2 + (\hat{x}_2 - x_{s,2})^2 + (\hat{x}_3 - x_{s,3})^2}}, \quad (26)$$

In this example it is thus assumed that the measurement is done with respect to one site, at the time of update. In an application, multiple measurements would appear as new rows. Note also that the Jacobian as given is given for the constant acceleration model, as an example. Obvious modifications appear for the constant velocity model. Note in particular that the Jacobian is irrelevant for the hovering mode, this being handled by stopping the update.

The range rate measurements have, as concluded further above, to be complemented by range measurement in order to give a reasonable result.

Nonlinear pathloss measurement is one possibility to use. The pathloss for multiple sites can be obtained using transmit power in the base station and the received power from the UE. The Ericsson model for the pathloss is here used as illustration, but also other models can be applied. This is related to the estimated state in the following measurement equation.

$$PL = \alpha_0 + \alpha_1 \log_{10}(d) + \alpha_2 \log_{10}(h_{bs}) + \alpha_3 \log_{10}(h_{bs}) \log_{10}(d) - 3.2(\log_{10}(11.75 h_n))^2 + g(f) = f(d(\hat{x})), \quad (27)$$

with $\alpha_0$, $\alpha_1$, $\alpha_2$, $\alpha_3$ being constants defined as in Table 1, $h_{bs}$ being the base station antenna height, $h_m$ being the mobile station antenna height, d is the distance between transmitter and receiver, defined as:

$$d(\hat{x}) = \sqrt{(\hat{x}_1 - x_{s,1})^2 + (\hat{x}_2 - x_{s,2})^2 + (\hat{x}_3 - x_{s,3})^2}. \quad (28)$$

Therefore, $$H(\hat{x}(k)) = f(d(\hat{x}(k))) = \alpha_0 +$$

$$\alpha_1 \log_{10}\left(\sqrt{(\hat{x}_1 - x_{s,1})^2 + (\hat{x}_2 - x_{s,2})^2 + (\hat{x}_3 - x_{s,3})^2}\right) + \alpha_2 \log_{10}(h_{bs}) +$$

$$\alpha_3 \log_{10}(h_{bs}) \log_{10}\left(\sqrt{(\hat{x}_1 - x_{s,1})^2 + (\hat{x}_2 - x_{s,2})^2 + (\hat{x}_3 - x_{s,3})^2}\right) -$$

-continued $$3.2(\log_{10}(11.75\hat{x}_3))^2 + g(f).$$

The derivative of the measurement model is defined as:

$$\frac{\partial h(\hat{x}(k))}{\partial \hat{x}} = \frac{\partial f}{\partial d}\frac{\partial d}{\partial \hat{x}}(k) = \begin{pmatrix} \frac{(\alpha_1 + \alpha_3 \log_{10}(h_{bs}))(\hat{x}_1(k) - x_{s,1}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]} \\ \frac{(\alpha_1 + \alpha_3 \log_{10}(h_{bs}))(\hat{x}_2(k) - x_{s,2}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]} \\ \frac{(\alpha_1 + \alpha_3 \log_{10}(h_{bs}))(\hat{x}_3(k) - x_{s,3}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]} - 2 \cdot 3.2 \, \log_{10}(11.75\hat{x}_3)\frac{1}{\ln(10)\hat{x}_3} \end{pmatrix},$$

(15)

Also, non-linear range measurements, e.g. based on RTT measurements may be used. The RTT based range measurement model is:

$$h(\hat{x}(k)) = \frac{2\sqrt{(\hat{x}_1(k) - x_{s,1}(k))^2 + (\hat{x}_2(k) - x_{s,2}(k))^2 + (\hat{x}_3(k) - x_{s,3}(k))^2}}{c}, \quad (30)$$

where $\hat{x}_i(\cdot)$, i=1,2, . . . denote the estimated states, $x_s(\cdot)$ denotes the site position and the constant c is the speed of light. The derivative of the measurement model is defined as:

(31)

$$\frac{\partial h(\hat{x}(k))}{\partial \hat{x}} = \begin{pmatrix} \frac{2(\hat{x}_1(k) - x_{s,1}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_2(k) - x_{s,2}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_3(k) - x_{s,3}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \end{pmatrix},$$

In this example it is assumed that the measurement is done with respect to one site, indexed s, at the time of update. In an application, multiple measurements would appear as new rows. Note also that the Jacobian as given here is for the hovering mode. Obvious modifications appear for the constant velocity and constant acceleration models.

The estimation of the kinematic state of the UE is typically done in a Cartesian coordinate system. If that system is earth tangential, the estimated height therefore will be given relative to e.g. the sea level or another fixed altitude. However, in implementations where the altitude above ground is the important feature, e.g. when it should be decided if the UE is connected to a drone. It may then be of interest to include a subtraction of a geographical ground altitude from the estimated altitude in order to obtain the altitude above ground.

Thus, in one embodiment, the method comprises the further step of subtracting a geographical ground altitude from the estimated altitude to obtain an altitude above ground.

Models for calculation of the altitude above mean sea level of the ground will thus be useful to the present ideas.

A first example of such a system would be a complete geographical information system (GIS) that consist of ground altitude maps covering the region of the cellular system. A second example would be to use a configured ground altitude, for each antenna site of the cellular system.

A third example would be to use a model of the ground altitude, valid in the interior of each cell of the cellular system, obtained by the method of T. Wigren, "Wireless hybrid positioning based on surface modeling with polygon support", Proc. VTC 2018 Spring, Porto, Portugal, June, 2018 [1].

A note on discretization may be useful for the reader. The models discussed in the detailed description of the present technology, are defined in continuous time, using differential equations. For computer implementation, they need to be discretized. Given a continuous time Wiener process:

$$dx = Axdt + Bdv \qquad (32)$$

it follows that the discrete time kinematic state equation after sampling with the sampling period T is:

$$x(k+1) = F_i x(k) + v(k) \qquad (33)$$

where $$F_i = e^{A_iT}, \, i=1,2,3 \qquad (34)$$

$$v(k) = \int_0^T e^{A_i(T-\tau)}B_i\hat{v}(kT+\tau)d\tau, \, i=1,2,3 \qquad (35)$$

and with the discretized process noise covariance:

$$Q = \mathbb{E}[v(k)v(k)']. \qquad (36)$$

It is assumed in the present disclosure that all continuous time equations are discretized like this before applying the IMM filter.

The kinematic state estimation discussed here above can be performed for one or a multitude of UEs. If all UEs within a certain area would be subjects for a kinematic state estimation, the signaling and computational load may become very high for areas hosting a large number of UEs. It may therefore be of interest to define a subset of UEs out of all present UEs for which the kinematic state estimation is of interest. A predetermined set of UEs can be defined, either by any external party or by the node performing the actual kinematic state estimation. Selection criteria may e.g. be based on previous movement history, type of UE, registered properties of a user of the UE etc.

In one embodiment, the UEs being subjects of kinematic state estimation are selected from a predetermined set of UEs.

In one embodiment, the method for kinematic state estimation of a UE comprises the further step of defining the predetermined set of UEs.

As briefly mentioned above, novel signaling of UE kinematic state information is provided. This information can be further utilized in different ways, e.g. for interference mitigation and/or flight restriction. The UE kinematic state information could be used to detach or interrupt drone communication, or alert relevant bodies that could take action against possible illegal activity.

The resulting kinematic state estimates may be further used by a network node or by any external party for many purposes. It can be used for positioning of individual drones. The kinematic state information can be sent to another network node e.g. another base station, controlling node, O&M, SON, etc. The kinematic state information may also be stored in an internal or external memory to be used at a later occasion, e.g. for statistical analyses for a particular drone or a plurality of drones, e.g., in a specific area. The kinematic state information may also trigger one or more operational tasks in the network node or another node. This could involve e.g. configuring specific measurements, signals, or messages related to the drone's kinematic state. The kinematic state information may also be used for triggering one or more actions in the network node or another node for controlling the drone movement. This could comprise to stop/block/redirect the drone movement or prevent the drone to cross a certain area. The kinematic state information may also trigger one or more preventive actions to control the impact of the drone movement. This may comprise alarming or notification upon crossing by the drone a designated area etc.

In one embodiment, the method for kinematic state estimation comprises the further step of initiating a transmission of kinematic state estimate information. The kinematic state estimate information comprises a kinematic state estimate information identifier, a UE identity, a time when the kinematic state estimate information is valid, and an estimated kinematic state, which estimated kinematic state comprises at least a three-dimensional position and preferably also a three-dimensional velocity.

A first action that can be taken based on the kinematic state information of UEs may be a categorization. If e.g. the main purpose is to detect the occurrence of rouge drones, specific patterns in the kinematic state information may indicate whether a UE is associated with a drone or not. A UE spending some non-negligible time in accordance with the hovering model, may likely be a drone-associated UE. At the contrary, a UE that never leaves the ground level is less likely to be associated with a drone. In other words, in one embodiment, the method for kinematic state estimation of a UE comprises the further step of categorizing UEs based on the kinematic state estimation.

When a UE is categorized to be associated with a drone, additional actions can be considered. One possibility is to influence the signalling to and from the UE, e.g. to control the interference contribution. In other words, in one embodiment, the method for kinematic state estimation of a UE comprises the further step of initiating an action on a communication with the UE based on the kinematic state estimation.

One way to reduce the interference caused by UE signalling would simply be to stop such signalling. This can either be done by demanding the UE to stop sending any signals in the uplink direction. Alternatively, the scheduling of uplink data from the UE could be stopped, which would reduce the uplink traffic. In other words, in one embodiment, the step of initiating an action comprises initiating a prohibition of at least a part of the uplink communication from the UE.

If the UE is associated with a drone that possibly illegally enters a restricted area, it might be of interest to at least interrupt the possibilities for the operator of the drone to further control the drone. Either authorized parties may try to achieve control over the drone to navigate the drone out of the restricted area. Another possibility is to ban all downlink communication, which means that the operator of the drone no longer can control the drone. In other words, in one embodiment, the step of initiating an action comprises initiating a prohibition of downlink communication from non-authorized parties to the UE.

An extension of shutting off of the drone operator could be to simply disconnect the UE from the wireless communication network entirely. The ID of the UE could be indicated as a non-authorized ID and no more connection to the wireless communication network is allowed. In other words, in one embodiment, the step of initiating an action comprises initiating a detachment of the UE from the wireless communication network.

The effect of a disconnection of the UE or a prohibition of downlink signaling would most likely be that the drone interrupts its mission and returns to the starting point by using an internal Global Positioning System (GPS) guidance. It may also fall down or land in a controlled manner. In case it returns, additional surveillance could be invoked in order to follow the drone back, and capture the pilot, if the drone intrusion was hostile.

Since the accuracy of the kinematic state estimation is quite high, the disclosed technology can be used to point out the position of the rouge drone very accurately. This opens up for other action, such as capturing the drone or even to destroy the drone.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), evolved Node Bs (eNB), or New Radio Node B (gNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a node configured for kinematic state estimation of a UE connected to a wireless communication network. The node is configured to obtain range rate measurement data defining a change rate of a distance between the UE and a range rate measuring position. The node is further configured to obtain range measurement data defining a distance between the UE and a range measuring position. The node is further configured to perform a kinematic state estimation of the UE based on at least the range rate measurement data and the range measurement data. The node is configured to perform the kinematic state estimation by utilizing interacting-multiple-model filtering comprising three interacting models. The interacting-multiple-model filtering comprises a three-dimensional constant velocity movement Wiener process, a three-dimensional constant acceleration movement Wiener process, and a three-dimensional constant position Wiener process.

Figure 15:
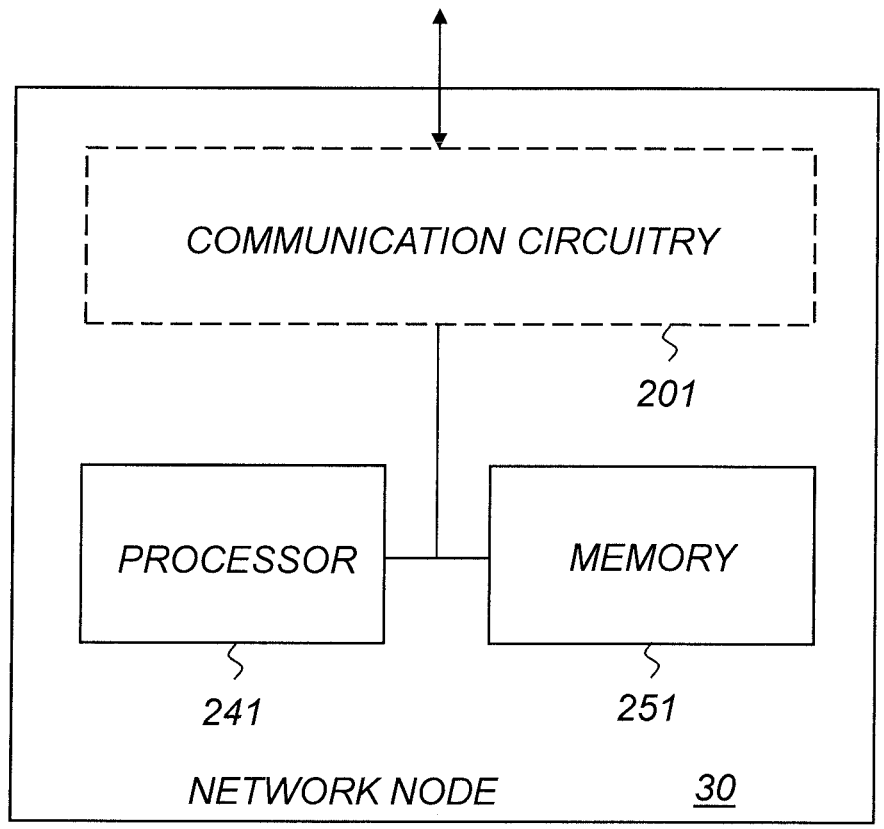
FIG. 15 is a schematic block diagram illustrating an embodiment of a network node.

FIG. 15 is a schematic block diagram illustrating an example of a network node 30, e.g. a base station, based on a processor-memory implementation according to an embodiment. In this particular example, the network node 30 comprises a processor 241 and a memory 251. The memory 251 comprises instructions executable by the processor 241, whereby the processor 241 is operative to perform the kinematic state estimation Thus, optionally, the network node 30 may also include a communication circuitry 201. The communication circuitry 201 may include functions for wired and/or wireless communication with other devices and/or network nodes in the network. In a particular example, the communication circuitry 10 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s). The communication circuit 201 is operative to receive the measurement information from another node.

In one embodiment, the node is configured to perform the kinematic state estimation in two parts, one of a kinematic state estimation based on the range rate measurement data and one of a kinematic state estimation based on the range measurement data.

In one embodiment, the node is further configured to obtain a range-rate time defining when the range rate measurement was performed and to obtain a range time defining when the range measurement was performed.

In a further embodiment, the node is configured to perform the kinematic state estimation as a combined estimation based on the range rate measurement data as well as the range measurement data if the range-rate time is equal to the range time.

In one embodiment, the range rate measurement data comprises data of Doppler measurements.

In one embodiment, the node is configured to perform the obtaining of range rate measurement data by receiving the range rate measurement data from another node.

In a further embodiment, the range rate measurement data comprises a value of a velocity of the UE in a direction away from the range rate measuring position.

In one embodiment, the range rate measurement data comprises a value of a Doppler frequency or Doppler frequency shift for the UE with respect to the range rate measuring position.

In one embodiment, the node comprises communication circuitry configured to receive the range rate measurement data from the other node.

In one embodiment, the node is configured for performing the obtaining of range rate measurement data by performing a range rate measurement concerning the UE.

In one embodiment, the range measurement data comprises data based on a propagation time measurement or data based on a power measurement.

In a further embodiment, the range measurement data comprises data associated with a path loss measurement.

In another further embodiment, the range measurement data comprises data associated with a timing advance measurement of a round trip time measurement.

In one embodiment, the node is configured to perform the obtaining of a range measurement data by receiving the range measurement data from another node.

In a further embodiment, the node comprises communication circuitry configured to receive the range measurement data from the other node.

In another further embodiment, the range measurement data comprises a value of a range between the UE and the range measuring position.

In one embodiment, the range measurement data comprises at least one of a path loss value; and a transmitted power and a received power.

In one embodiment, the range measurement data comprises at least one of:
a value of a one-way propagation time for a radio signal between the UE and the range measuring position or between the range measuring position and the UE;

a value of a round trip time for radio signals forth and back between the UE and the range measuring position; and a time stamp for transmission of a downlink signal, a time stamp for reception of an uplink signal triggered by the downlink signal and a value of a round trip time delay in the UE.

In one embodiment, the node is configured to perform the obtaining of range measurement data as performing a range measurement concerning the UE.

In one embodiment, the node is further configured to obtain data enabling determination of the range rate measuring position and to obtain data enabling determination of the range measuring position.

In one embodiment, at least one of the data enabling determination of the range rate measuring position and the data enabling determination of the range measuring position comprises position data of the range rate measuring position or the range measuring position, respectively.

In one embodiment, at least one of the data enabling determination of the range rate measuring position and the data enabling determination of the range measuring position comprises an identity of a node performing the range rate measurement or range measurement, respectively, whereby the node is further configured to retrieve a position of the node performing the range rate measurement or range measurement, respectively, from a data storage based on the identity of the node performing the range rate measurement or range measurement, respectively.

In one embodiment, at least one of the range rate measurement and the range measurement is performed by a base station.

In one embodiment, the node is further configured to repeat at least one of the obtaining of range rate measurement data and the obtaining of range measurement data as well as the performing of a kinematic state estimation for additional measurements concerning the UE.

In a further embodiment, the repeating is performed for measurements performed by different nodes.

In another further embodiment, the repeating is performed for non-synchronized measurements.

In one embodiment, the node is further configured to obtain an identity of the UE.

In one embodiment, the node is further configured to repeat at least one of the obtaining of range rate measurement data and the obtaining of range measurement data as well as the performing of a kinematic state estimation for additional UEs.

In a further embodiment, the UE and the additional UEs are selected from a predetermined set of UEs.

In a further embodiment, the node is further configured to define the predetermined set of UEs.

In one embodiment, the interacting-multiple-model filtering comprises a reduced switching probability between the three-dimensional constant velocity movement Wiener process and the three-dimensional constant position Wiener process.

In a further embodiment, the reduced switching probability between the three-dimensional constant velocity movement Wiener process and the three-dimensional constant position Wiener process is at least two orders of magnitude lower than for switching probabilities involving the three-dimensional constant acceleration movement Wiener process.

In one embodiment, the node is configured to perform the kinematic state estimation by utilizing Extended Kalman Filtering.

In one embodiment, the node is further configured to subtract a geographical ground altitude from an estimated altitude to obtain an altitude above ground.

In one embodiment, the node is further configured to initiate a transmission of kinematic state estimate information. The kinematic state estimate information comprises a kinematic state estimate information identifier, a UE identity, a time when the kinematic state estimate information is valid, and an estimated kinematic state. The estimated kinematic state comprises at least a three-dimensional position and preferably also a three-dimensional velocity.

In one embodiment, the node is further configured to categorize UEs based on the kinematic state estimation.

In one embodiment, the node is further configured to initiate an action on a communication with the UE based on the kinematic state estimation.

In a further embodiment, the node is configured to perform the initiating of an action by initiating a prohibition of downlink communication from non-authorized parties to the UE.

In one embodiment, the node is configured to perform the initiating of an action by initiating a prohibition of at least a part of uplink communication from the UE.

In a further embodiment, the node is configured to perform the initiating of an action by initiating a detachment of the UE from the wireless communication network.

In one embodiment, the node is configured to perform the obtaining of measurement information by performing the range-related measurement concerning the UE. In a further embodiment the node comprises a processor and a memory, where the memory comprises instructions executable by the processor, whereby the processor is operative to perform the range-related measurement concerning the UE.

In one embodiment, the node is configured to perform the kinematic state estimation of the UE based on measurement data comprising, a value of the According to another aspect of the proposed technology there is provided a node configured for assisting in kinematic state estimation of a UE connected to a wireless communication network. The node is configured to obtain range rate measurement data defining a change rate of a distance between the UE and a range rate measuring position. The node is further configured to obtain range measurement data defining a distance between the UE and a range measuring position. The node is further configured to compile the measurement information related to a multitude of range rate measurement data and a multitude of range measurement data into compiled measurement information. The node is further configured to initiate a transferring of the compiled measurement information to a kinematic state estimation node.

FIG. 15 may also be interpreted as a schematic block diagram illustrating an example of a network node 30, e.g. a base station, based on a processor-memory implementation according to another embodiment. In this particular example, the network node 30 comprises a processor 241 and a memory 251, the memory 251 comprising instructions executable by the processor 241, whereby the processor 241 is operative to perform the compilation of the measurement information.

Optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s). The communication circuit 201 is operative to initiate the transferring of the compiled measurement information.

In one embodiment, the range rate measurement data comprises data of Doppler measurements.

In one embodiment, the range measurement data comprises data based on a power measurement.

In a further embodiment, the range measurement data comprises data associated with a path loss measurement.

In one embodiment, the node is configured to perform the obtaining of range rate measurement data and the obtaining of range measurement data by performing a range rate and performing a range measurement, respectively, concerning the UE.

In one embodiment, the node is configured to perform the obtaining of range rate measurement data and the obtaining of range measurement data by receiving measurement information from another node.

In one embodiment, the range rate measurement data comprises a value of a velocity of the UE in a direction away from the range rate measuring position.

In one embodiment, the range rate measurement data comprises a value of a Doppler frequency or Doppler frequency shift for the UE with respect to the range rate measuring position.

In one embodiment, the range rate measurement data comprises a value of a range between the UE and the range rate measuring position.

In one embodiment, the range measurement data comprises at least one of a path loss value; and a transmitted power and a received power.

In one embodiment, the compiled measurement information comprises measurement data comprising a value of a velocity of the UE in a direction away from the range rate measuring position, and a value of a range between the UE and the range rate measuring position.

In one embodiment, the compiled measurement information comprises measurement data comprising at least one of:
a value of a Doppler frequency or Doppler frequency shift for the UE with respect to the range rate measuring position; and
at least one of a path loss value and a transmitted power and a received power.

In one embodiment, the node is a base station (20).

According to another aspect of the proposed technology there is provided a node configured for assisting in kinematic state estimation of a UE connected to a wireless communication network. The node is configured to perform a range rate measurement defining a change rate of a distance to the UE. The node is further configured to perform a range measurement defining a distance to the UE. The node is further configured to initiate a transferring of range rate measurement data and range measurement data to a kinematic state estimation node.

FIG. 15 may also be interpreted as a schematic block diagram illustrating an example of a network node 30, e.g. a base station, based on a processor-memory implementation according to another embodiment. In this particular example, the network node 30 comprises a processor 241 and a memory 251, the memory 251 comprising instructions executable by the processor 241, whereby the processor 241 is operative to perform the range rate measurement and the range measurement.

Optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s). The communication circuit 201 is operative to initiate the transferring of range rate measurement data and range measurement data.

In one embodiment, the node a base station.

In one embodiment, the node is an evolved Node B or a New Radio Node B.

In a wireless communication network, e.g. according to any of the FIGS. 8-13, there is at least one node configured for kinematic state estimation of a UE connected to a wireless communication network and preferably at least node for assisting in kinematic state estimation of a UE connected to a wireless communication network. In other words, there is one node hosting the kinematic state estimation functions and at least one node providing measurement data.

In some embodiments, the wireless communication network may also comprise intermediate nodes for assisting in kinematic state estimation of a UE connected to a wireless communication network. These intermediate nodes host functionalities for compiling measurement data according to the principles discussed further above.

Figure 16:
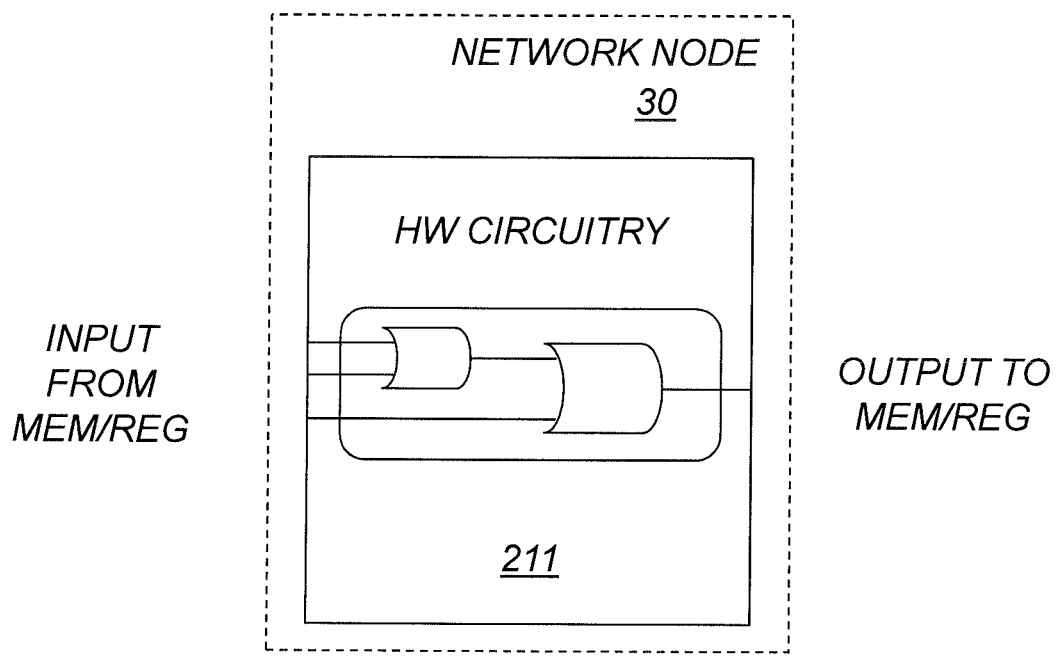
FIG. 16 is a schematic block diagram illustrating an embodiment of a network node based on a hardware circuitry implementation.

FIG. 16 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 17:
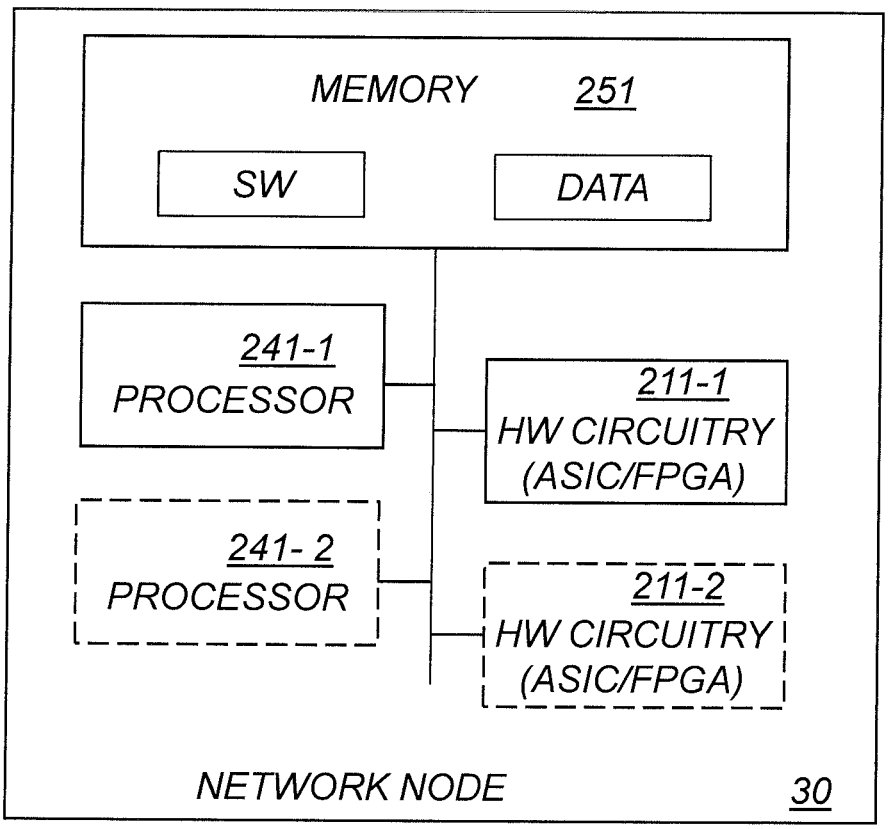
FIG. 17 is a schematic block diagram illustrating another embodiment of a network node based on combination of both processor and hardware circuitry.

FIG. 17 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 18 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to obtain range rate measurement data defining a change rate of a distance between a UE and a range rate measuring position, to obtain range measurement data defining a distance between the UE and a range measuring position, and to perform a kinematic state estimation of the UE based on at least the range rate measurement data and the range measurement data. The performing of a kinematic state estimation comprises interacting-multiple-model filtering comprising three interacting models. The interacting-multiple-model filtering comprises a three-dimensional constant velocity movement Wiener process, a three-dimensional constant acceleration movement Wiener process, and a three-dimensional constant position Wiener process.

In another particular embodiment, the computer program 231 comprises instructions, which when executed by at least one processor 241, cause the processor(s) 241 to obtain range rate measurement data defining a change rate of a distance between a UE and a range rate measuring position, to obtain range measurement data defining a distance between the UE and a range measuring position to compile the measurement information related to a multitude of range rate measurement data and a multitude of range measurement data into compiled measurement information, and to initiate a transferring of the compiled measurement information to a kinematic state estimation node.

In yet another particular embodiment, the computer program 231 comprises instructions, which when executed by at least one processor 241, cause the processor(s) 241 to perform a range rate measurement defining a change rate of a distance to a UE, to perform a range measurement defining a distance to the UE, and to initiate a transferring of range rate measurement data and range measurement data to a kinematic state estimation node.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Thus, in one embodiment, a computer-program product comprises a computer-readable medium having stored thereon a computer program as described here above.

In one embodiment, the carrier is one of an electronic signal, an optical signal, an electromagnetic signal, a magnetic signal, an electric signal, a radio signal, a microwave signal, or a computer-readable storage medium.

FIG. 19 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 20:
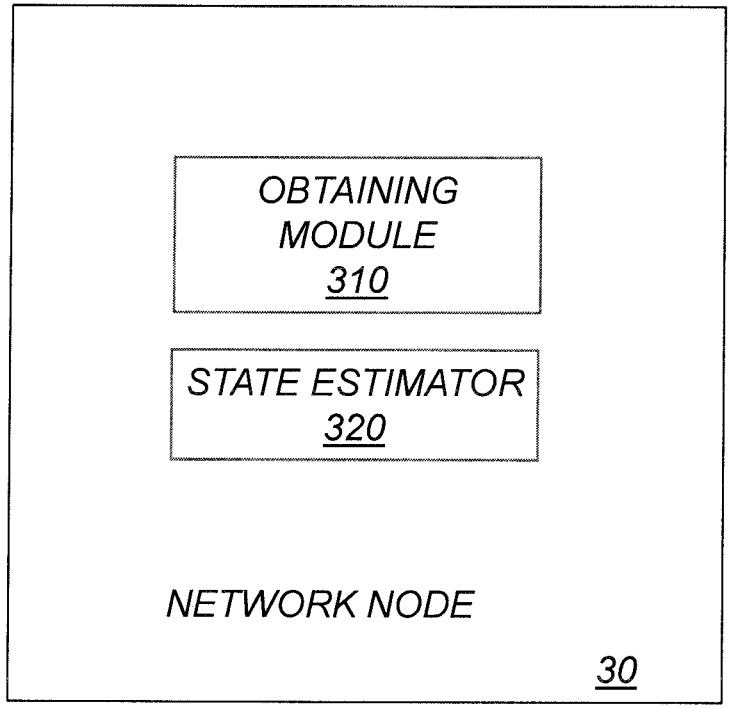
FIG. 20 is a schematic diagram illustrating an embodiment of a network node.

FIG. 20 is a schematic diagram illustrating an example of a network node 30 for kinematic state estimation of a UE connected to a wireless communication network. The network node 30 comprises an obtaining module 310 for obtaining measurement information related to a range-related measurement concerning a UE. The measurement information comprises data of the range-related measurement, a time at which the range-related measurement was performed, an identity of the UE and data enabling determination of a measuring position. The range-related measurement consists of data defining a distance between the UE and the measuring position. The network node 30 further comprises a kinematic state estimator 320 for performing a kinematic state estimation of the UE based on the measurement information.

Figure 21:
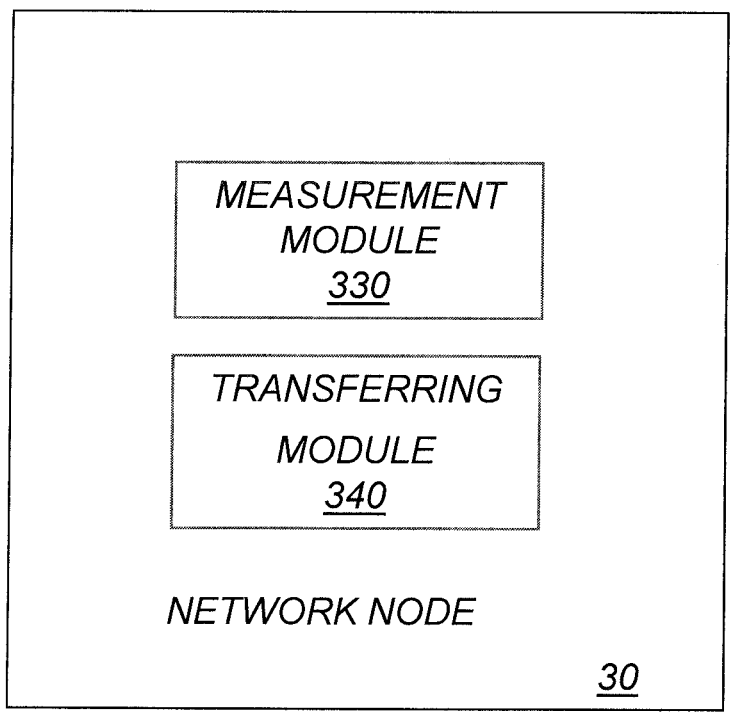
FIG. 21 is a schematic diagram illustrating another embodiment of a network node.

FIG. 21 is a schematic diagram illustrating an example of a network node 30 for assisting in kinematic state estimation of a UE connected to a wireless communication network. The network node 30 comprises a measurement module 330 for performing a range-related measurement concerning the UE. The network node 30 further comprises a transferring module 340 for initiating a transferring of measurement information related to the range-related measurement to a kinematic state estimation node. The measurement information comprises data of the range-related measurement, a time at which the range-related measurement was performed, an identity of the UE and data enabling determination of a measuring position. The range-related measurement consists of data defining a distance between the UE and the measuring position.

Figure 22:
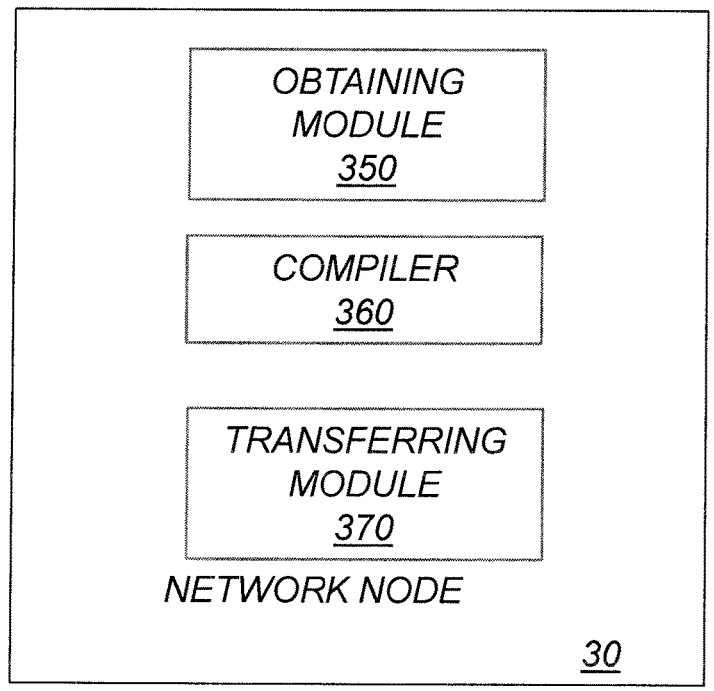
FIG. 22 is a schematic diagram illustrating yet another embodiment of a network node.

FIG. 22 is a schematic diagram illustrating an example of a network node 30 for assisting in kinematic state estimation of UEs connected to a wireless communication network. The network node 30 comprises an obtaining module 350 for obtaining measurement information related to a multitude of range-related measurements concerning at least one UE. The measurement information comprising data of the range-related measurement, a time at which the range-related measurement was performed, an identity of the UE and data enabling determination of a measuring position. The range-related measurement consists of data defining a distance between the UE and the measuring position. The network node 30 further comprises a compiler 360 for compiling the measurement information related to a multitude of range-related measurements into compiled measurement information. The network node 30 further comprises a transferring module 370 for initiating a transferring of the compiled measurement information to a kinematic state estimation node.

Alternatively, it is possible to realize the module(s) in FIGS. 20-22 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

For the purpose of illustrating the operation and performance of the proposed technology, a drone IMM estimator performance has been simulated.

A kinematic state estimation scenario is the following:
The drone starts at initial position [0 0 0] with the initial velocity [0 0 0]. It continues with constant acceleration, i.e. increasing velocity, for a short period, then constant speed, followed by braking, during 40s upwards (mode 1). Then it does hover for 20s (mode 3). The movement is followed by constant acceleration, i.e. increasing velocity, followed by constant speed, towards the right for 20s (mode 1). Then it does a coordinated left turn for 20s (mode 2). The movement is continued by constant velocity towards the right for 20s (mode 1). Then the drone performs a coordinated right turn for 20s (mode 2). Then the drone decreasing velocity for 20s (mode 1). Then finally the drone performs hovering for 20s (mode 3).

Site positions of measuring nodes are:

$S_1=(200\ 100\ 5)'$ $S_2=(100-100\ 30)'$ $S_3=(800-50\ 70)'$ $S_4=(500-100\ 50)'$ $S_5=(50\ 200\ 180)'$

Used parameters are:
T=1 second
n=180 number of discrete time steps
Measurement noise variances for range, pathloss and range rate are selected as $$R = \begin{bmatrix} 25^2 & 0 & 0 \\ 0 & 5^2 & 0 \\ 0 & 0 & 0.5^2 \end{bmatrix}$$

Range measurement standard deviation is 25 m, pathloss standard deviation is 5 dB, and range rate standard deviation is 0.5. Note that the scaling by $f_c/c$ are included automatically by the direct change to speed for the Doppler measurements.

Process noise variances for constant velocity, acceleration and hovering models are $q_{11}q_{12}=q_{13}=0.1$, $q_{21}=q_{22}=q_{23}=1.0$ and $q_{31}=q_{32}=q_{33}=0.01$, respectively.

The IMM transition probability matrix was:

$$p_{ij} = \begin{bmatrix} 0.98 & 0.05 & 0.2 \\ 0.5 & 0.90 & 0.05 \\ 0.09 & 0.06 & 0.95 \end{bmatrix}$$

The initial conditions were:

$X_0^1=[0\ 0\ 0\ 0\ 0\ 1]'$ $P_0^1=\text{diag}([100\ 100\ 100\ 4\ 4\ 4])$ $X_0^2=[0\ 0\ 0\ 0\ 0\ 1\ 0\ 0\ 0]'$ $P_0^2=\text{diag}([100\ 100\ 100\ 4\ 4\ 4\ 1\ 1\ 1])$ $X_0^3 = [0\ 0\ 0]'$ $P_0^3 = \text{diag}([100\ 100\ 100]\})$ Ericsson nonlinear pathloss model with parameters for suburban area is used. The carrier frequency is selected as $f_c = 2$ GHz.

Figure 23:
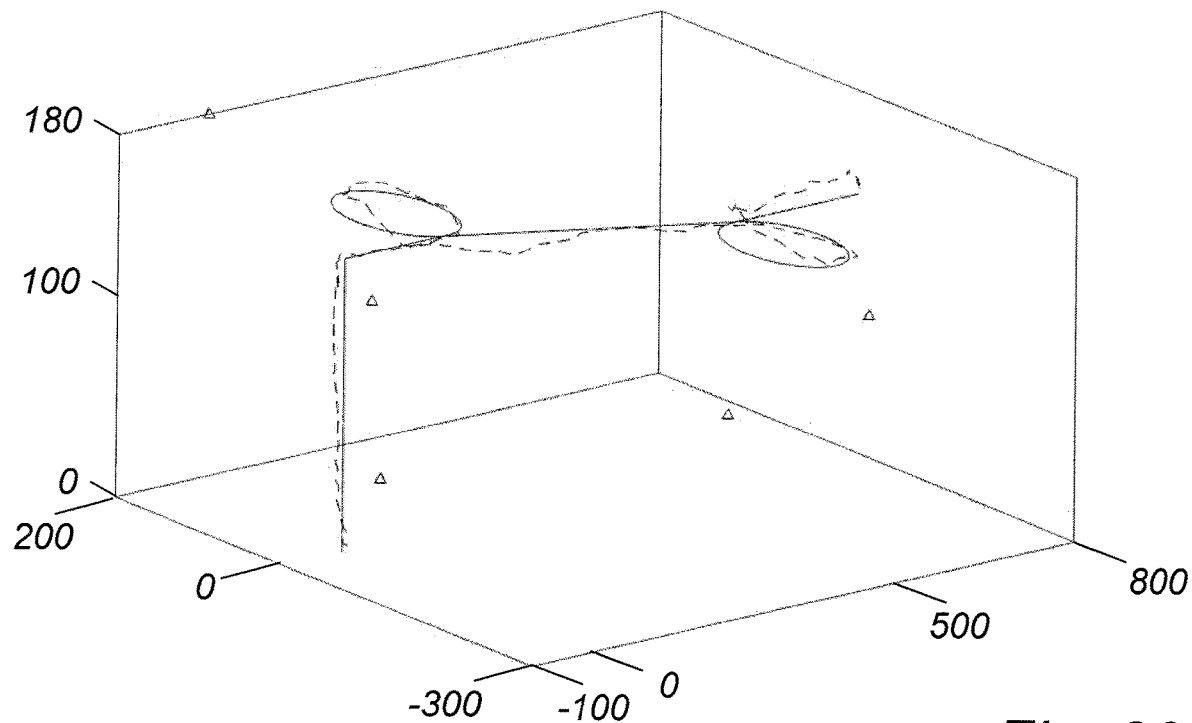
FIG. 23 illustrates a true trajectory, an estimated trajectory and site positions of a simulation.
Figure 24:
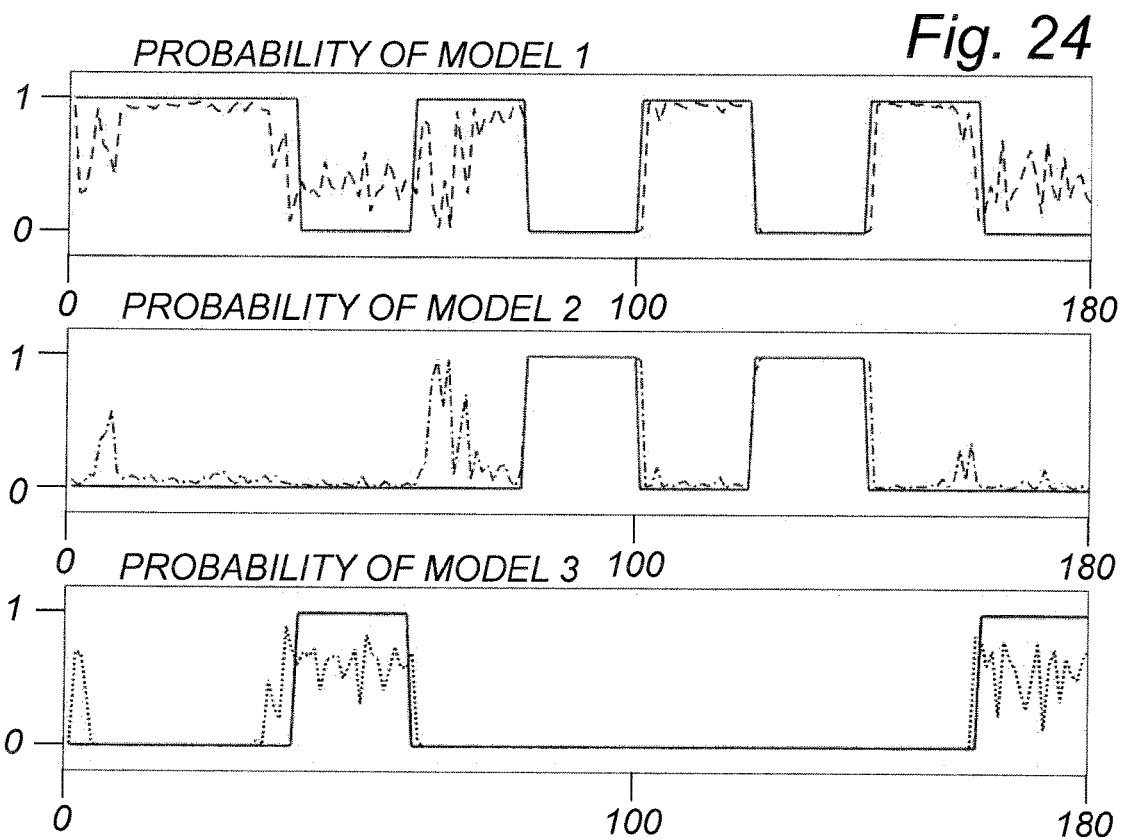
FIG. 24 illustrates the true and estimated mode probabilities for the different models of the simulation of FIG. 23.

The result of the simulation is shown in FIG. 23 and FIG. 24. FIG. 23 illustrates the true kinematic state trajectory (full line), the IMM filtered trajectory (broken line) and the site positions (triangles) of the simulation. The agreement between the estimated trajectory and the true trajectory is satisfactory.

FIG. 24 illustrates the true and estimated mode probabilities for the different models. The true modes are illustrated by full lines, whereas the respective estimated mode probabilities are presented by dotted or broken lines. The simulation proves that the estimated trajectory is fairly accurate and that the estimated mode probabilities behave as expected.

Figure 25:
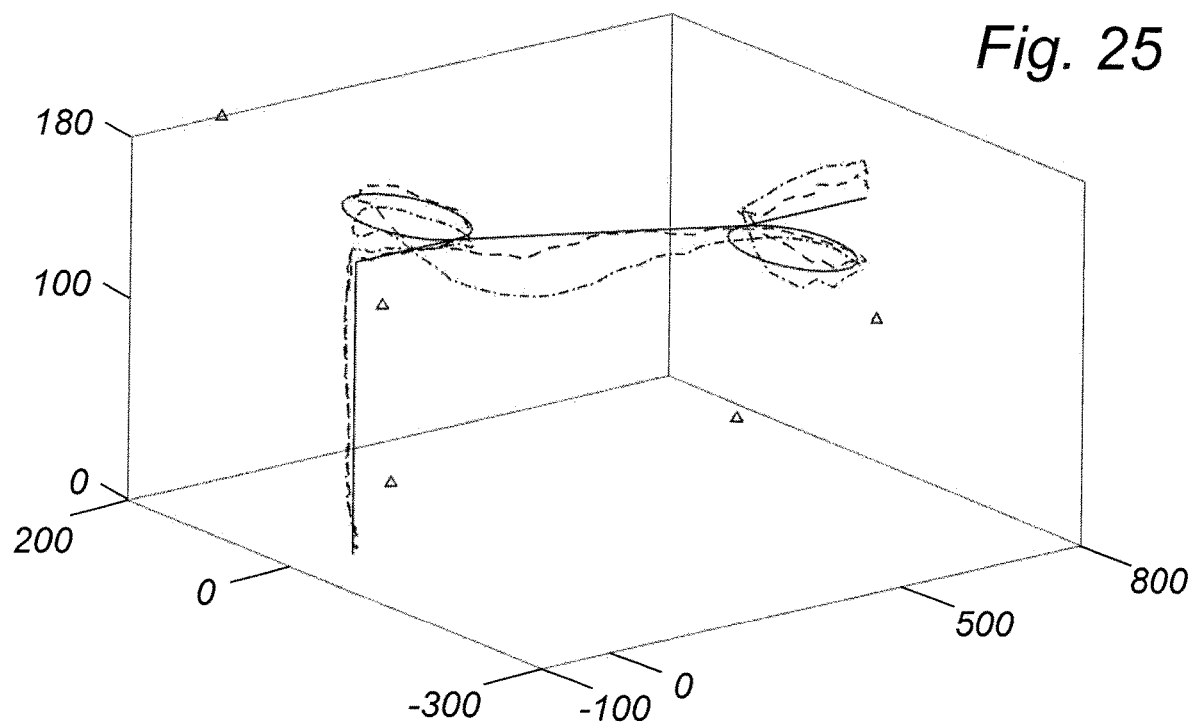
FIG. 25 illustrates a true trajectory, an estimated IMM trajectory, an estimated EKF trajectory and site positions of the simulation.

FIG. 25 shows as a comparison a pure EKF of mode 1 only. The true kinematic state trajectory (full line), the IMM filtered trajectory (broken line), the EKF-mode 1 simulation and the site positions (triangles) of the simulation are illustrated. It can be observed that IMM performs a better tracking than only EKF. Mean square errors of position estimates were 152.4577 for the EKF tracking and 58.9503 for the IMM tracking. Mean square errors of velocity estimates were 4.5195 for EKF and 0.4961 for IMM.

Figure 26:
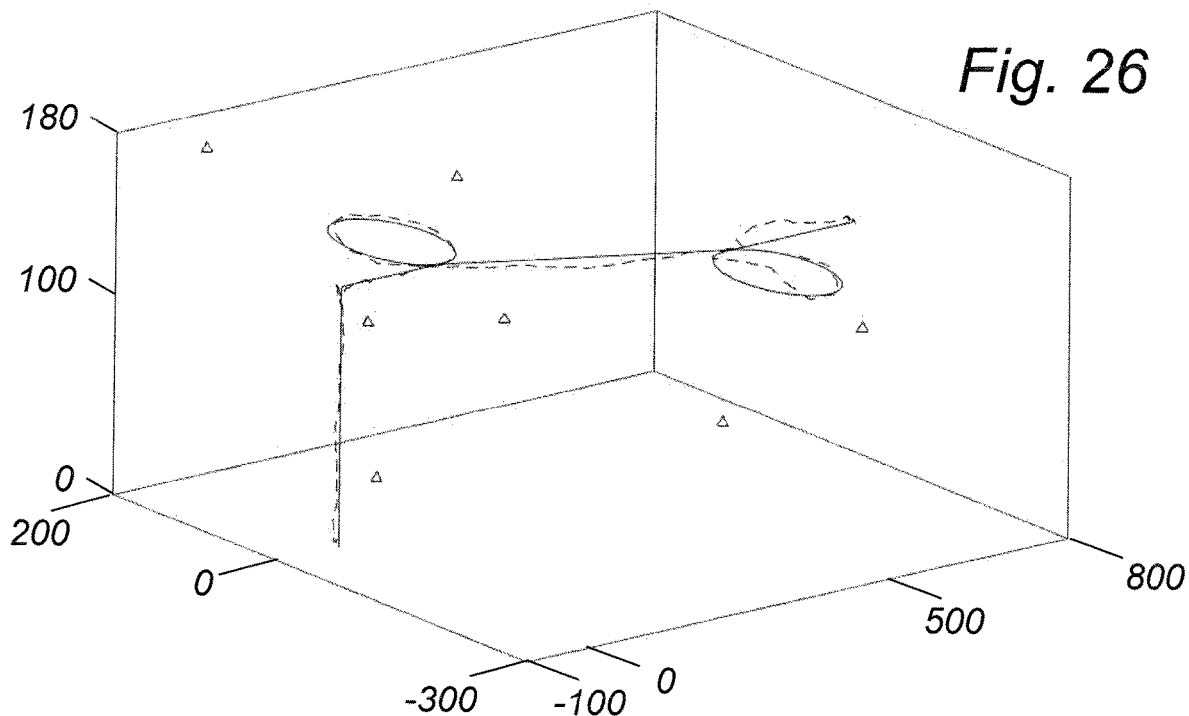
FIG. 26 illustrates a true trajectory, an estimated trajectory and site positions of another simulation.
Figure 27:
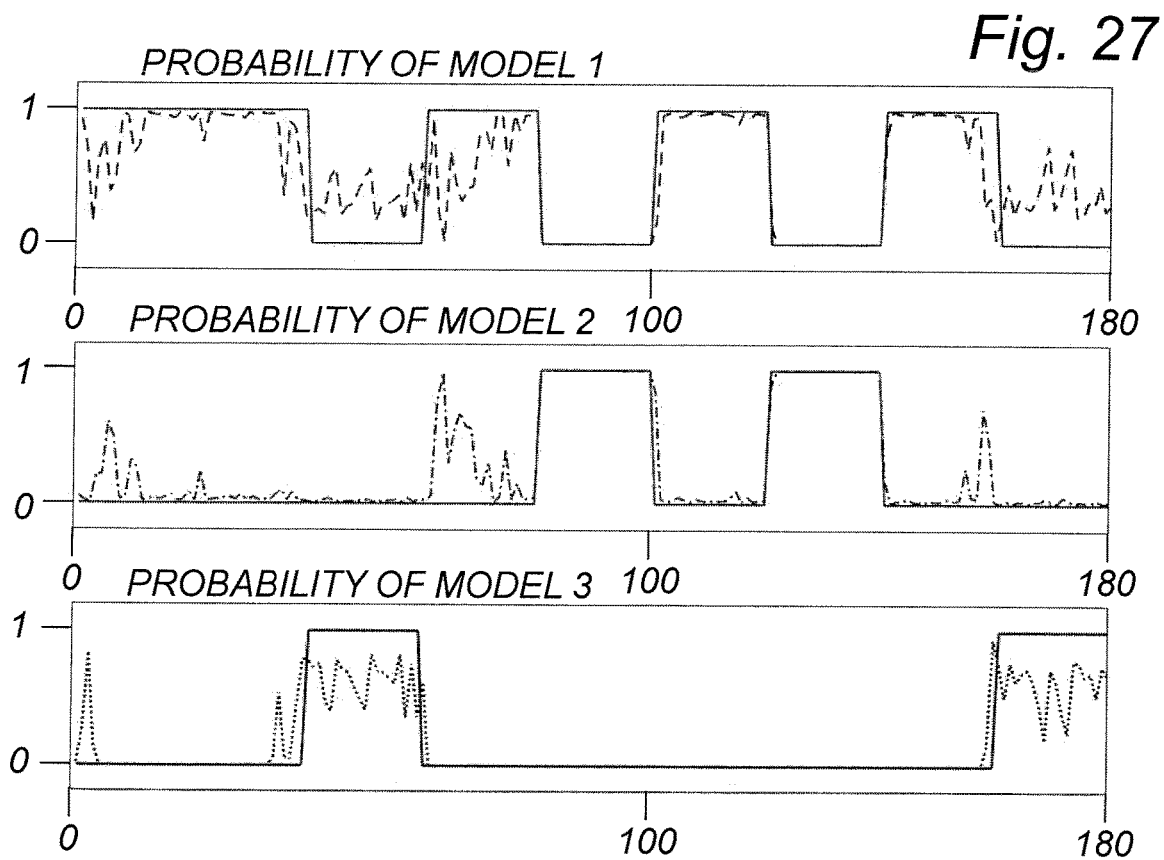
FIG. 27 illustrates the true and estimated mode probabilities for the different models of the simulation of FIG. 26.

Next, the number of sites was increased to 7 sites $S_1 = (200\ 100\ 5)'$ $S_2 = (100\ 40\ 110)'$ $S_3 = (800\ -50\ 100)'$ $S_4 = (500\ -100\ 80)'$ $S_5 = (300\ 20\ 100)'$ $S_6 = (150\ -30\ 200)'$ $S_7 = (50\ 200\ 180)'$ The result of the simulation is shown in FIG. 26 and FIG. 27. FIG. 26 illustrates the true kinematic state trajectory (full line), the IMM filtered trajectory (broken line) and the site positions (triangles) of the simulation. The agreement between the estimated trajectory and the true trajectory is convincing.

FIG. 27 illustrates the true and estimated mode probabilities for the different models. The true modes are illustrated by full lines, whereas the respective estimated mode probabilities are presented by dotted or broken lines. The simulation proves that the estimated trajectory is very accurate and that the estimated mode probabilities behave as expected. As it can be observed, an increasing number of sites improves the estimation results.

Figure 28:
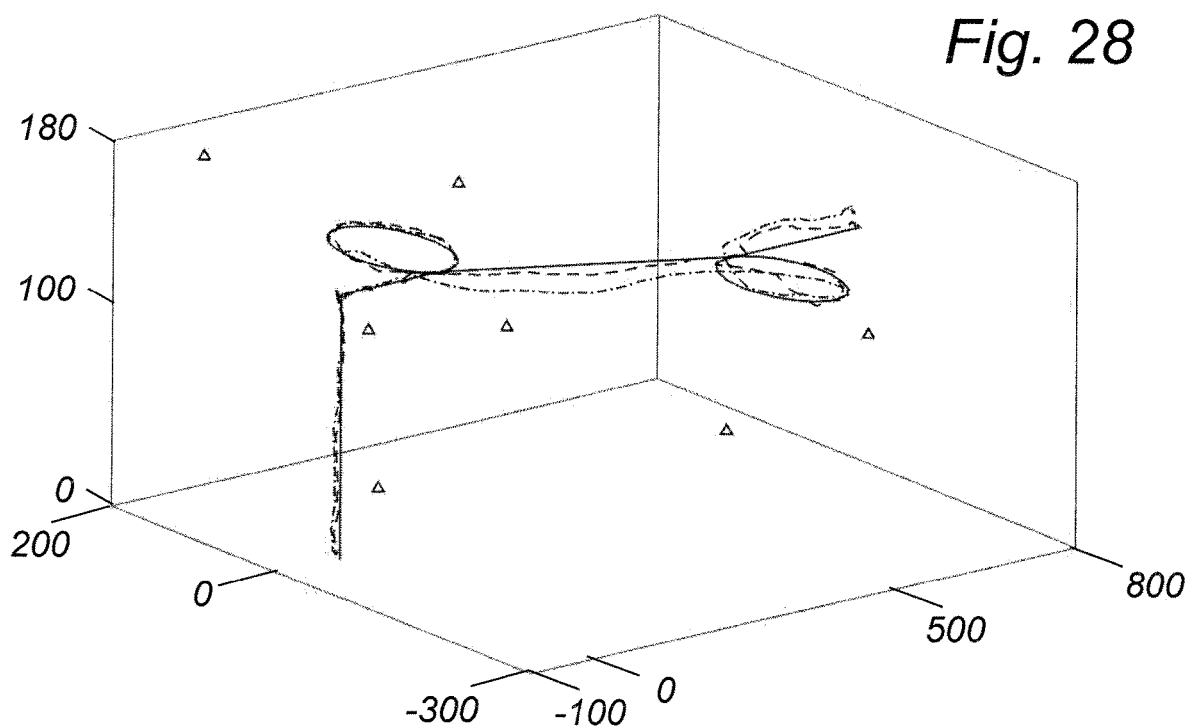
FIG. 28 illustrates a true trajectory, an estimated IMM trajectory, an estimated EKF trajectory and site positions of the other simulation.

A similar result for the EKF simulation is shown in FIG. 28. Mean square errors of position estimates were 29.9649 for the EKF tracking and 26.4654 for the IMM tracking. Mean square errors of velocity estimates were 2.7409 for EKF and 0.2720 for IMM.

Finally, it can be noted that the velocity estimates are excellent, a fact that will make highly sensitive drone type probability estimation feasible.

Obviously, the estimation of the state is done in a Cartesian coordinate system. If that system is earth tangential, the method needs to include the subtraction of a geographical ground altitude from the estimated altitude to obtain the altitude above ground.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 29:
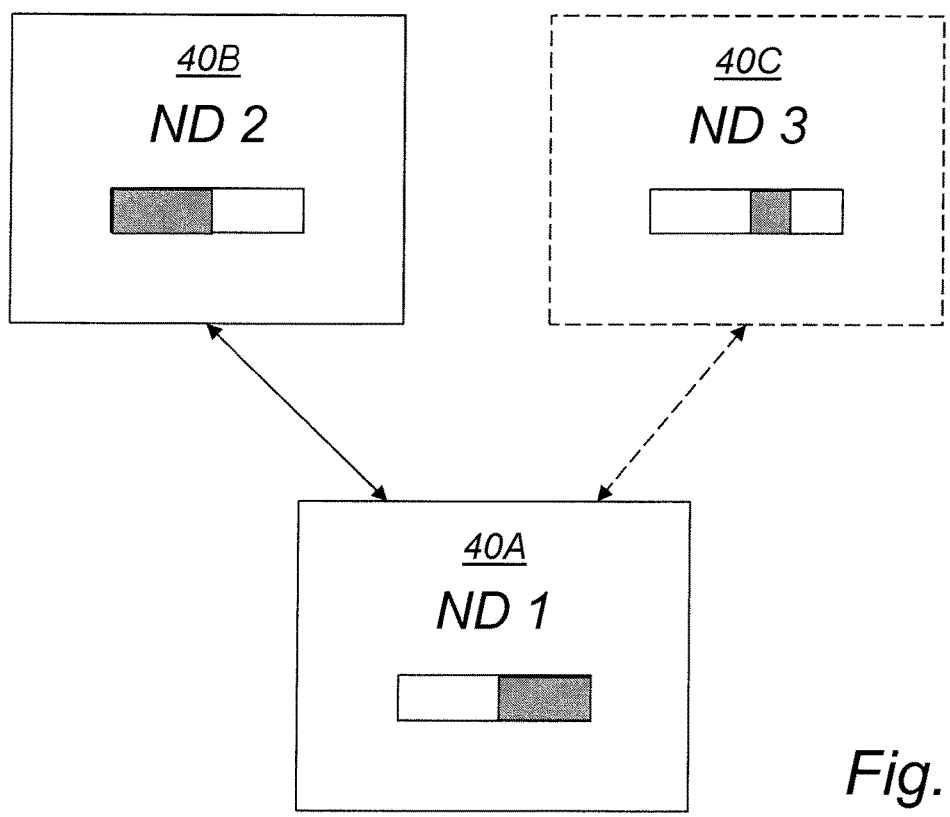
FIG. 29 is a schematic diagram illustrating a general example of functionality distribution or partition.

FIG. 29 is a schematic diagram illustrating an example of how functionality can be distributed or partitioned between different Network Devices (ND) in a general case. In this example, there are at least two individual, but interconnected, network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 30:
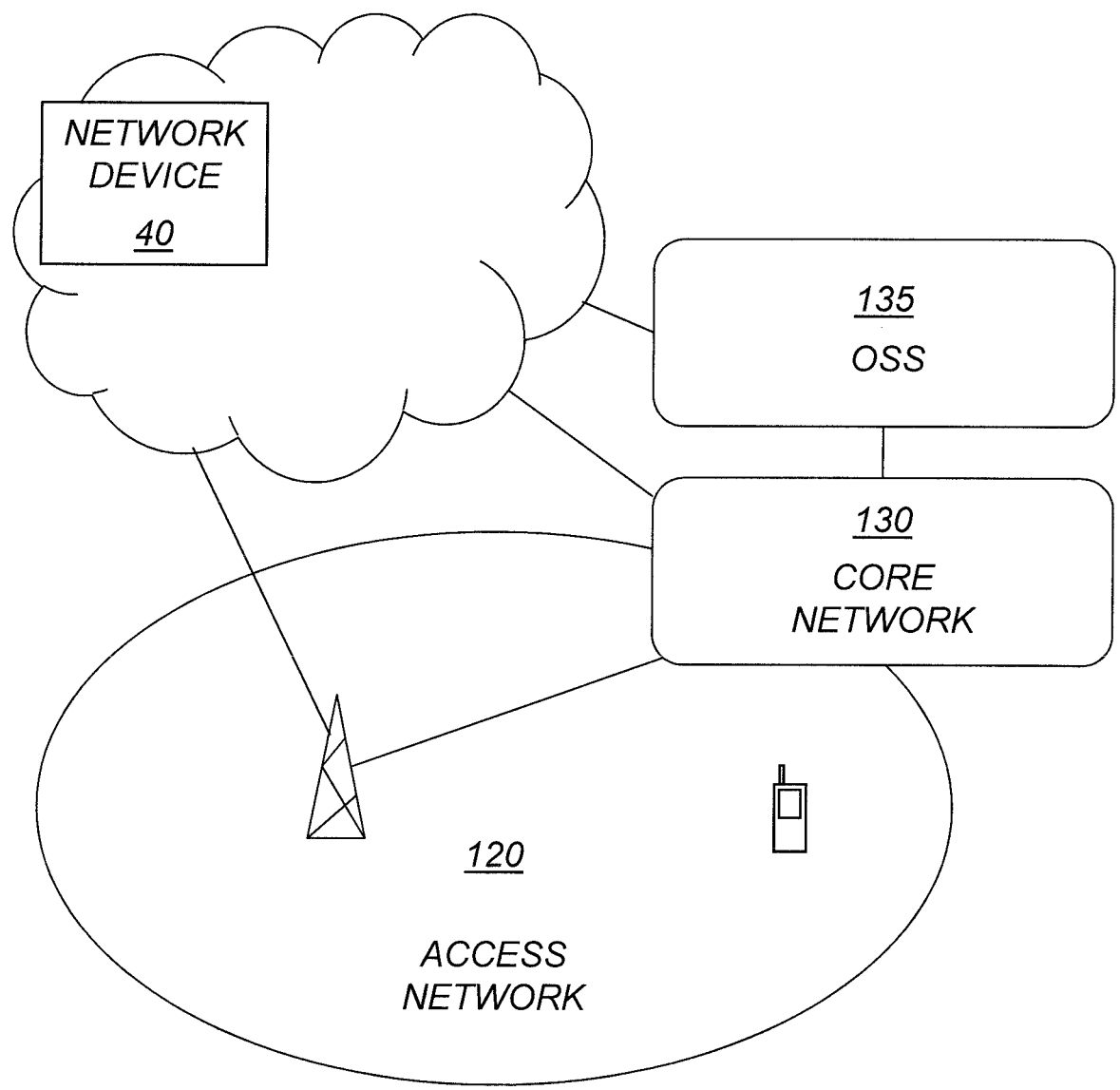
FIG. 30 is a schematic diagram illustrating an example of a wireless communication system in cooperation with one or more cloud-based network devices.

FIG. 30 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general-purpose network device, or a hybrid thereof.

A special-purpose network device may use custom processing circuits and a proprietary operating system (OS), for execution of software to provide one or more of the features or functions disclosed herein.

A general-purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general-purpose network device may for example include hardware comprising a set of one or more processor(s), often COTS processors, and network interface controller(s) (NICs), as well as non-transitory machine-readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

The present technology discloses in a preferred embodiment an IMM filter with a new combination of models, adapted to the hovering capabilities of drones, with a new restricted mode transition probability model, reflecting the characteristics of the hovering capability, as well as with integrated measurement fusion of range only measurements with respect to multiple eNBs/gNBs. Furthermore, new signaling means for distribution of estimated drone information and information derived therefrom, to RAN eNBs/gNBs, other EPC nodes than the kinematic state estimation node, or to external sources are presented. Also, the preferred embodiment comprises a node architecture of the drone kinematic state estimation system that resides in, or is closely related to the eNB/gNB, or in an external node. A new range measurement principle, with associated signaling allowing high accuracy, and measurement of ranges between multiple base stations and a drone is used.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Appendix A

FIG. 2 describes one cycle of the typical IMM algorithm, which consists of r interacting filters operating in parallel. The mixing is done at the input of the filters, at the kinematic state interaction/mixing unit, with the probabilities, conditioned on data $Z^{k-1}$. The structure of the IMM algorithm is:

$$(N_e; N_f) = (r; r), \quad (A1)$$

where $N_e$ is the number of estimates at the start of the cycle of the algorithm and $N_f$ is the number of filters in the algorithm.

One cycle of the algorithm consists of the following. Mixing probabilities (i,j=1, . . . , r) are calculated. The probability that mode $M_i$ was in effect at time k−1 given that $M_j$ is in effect at k conditioned on $Z^{k-1}$ is:

$$\mu_{i|j} = \frac{1}{\bar{c}_j} p_{ij} \mu_i(k-1), \quad (A2)$$

where the normalizing constants are given by the below equation. This equation uses the mode transition probabilities $p_{ij}$, which is the respective probability that the estimated object is in mode j at time k, conditioned on being in mode i at time k−1. The expression for the normalizing constant is:

$$\bar{c}_j = \Sigma_{i=1}^r p_{ij} \mu_i(k-1). \quad (A3)$$

Next, mixing is performed for (j=1, . . . r). Starting with $\hat{x}^i(k-1|k-1)$ one components the mixed initial condition for the filter matched to $M_j(k)$ as:

$$\hat{x}^{0j}(k-1|k-1) = \Sigma_{i=1}^r \hat{x}^i(k-1|k-1) \mu_{i|j}(k-1|k-1)$$
$$j=1, \ldots, r. \quad (A4)$$

The covariance corresponding to the above is:

$$P^{0j}(k-1|k-1) = \Sigma_{i=1}^r \mu_{i|j}(k-1|k-1) \{P^i(k-1|k-1) + [\hat{x}^i(k-1|k-1) - \hat{x}^{0j}(k-1|k-1)] \cdot [\hat{x}^i(k-1|k-1) - \hat{x}^{0j}(k-1|k-1)]'\}, \quad (A5)$$

with ' denoting the transpose.

Next, mode-matched filtering is performed for (j=1, . . . r). The estimate and the covariance obtained in eq. (5) are used as input to the filter matched to $M_j(k)$, which uses z(k) to yield $\hat{x}^j(k|k)$ and $P^j(k|k)$.

The likelihood function corresponding to the r filters:

$$\Lambda_j(k) = p[z(k)|M_j(k), Z^{k-1}] \quad (A6)$$

are computed using the mixed initial condition and the associated covariance as:

$$\Lambda_j(k) = p[z(k)|M_j(k), \hat{x}^{0j}(k-1|k-1) P^{0j}(k-1|k-1)]$$
$$j=1, \ldots, r. \quad (A7)$$

Model probability update is performed for (j=1, . . . , r). This is done as follows:

$$\mu_j(k) = \frac{1}{c} \Lambda_j(k) \bar{c}_j \quad j = 1, \cdots, r, \quad (A8)$$

where $\bar{c}_j$ is given above and $$c = \Sigma_{j=1}^r \Lambda_j(k) \bar{c}_j \quad (A9)$$

is the normalization factor.

Estimate and covariance combination is performed. Combination of the model-conditioned estimates covariances is done according to the mixture equations:

$$\hat{x}(k|k) = \Sigma_{j=1}^r \hat{x}^j(k|k) \mu_j(k)$$

$$P(k|k) = \Sigma_{j=1}^r \mu_j(k) \{P^j(k|k) + [\hat{x}^j(k|k) - \hat{x}(k|k)][\hat{x}^j(k|k) - \hat{x}(k|k)]'\}. \quad (A10)$$

Appendix B

The dynamic model of the EKF is:

$$x(k+1) = F(k) \times (k) + v(k), \quad (B1)$$

where x(k) is the $n_x$-dimensional kinematic state vector, and v(k), k=0,1, . . . is the sequence of zero-mean white Gaussian process noise (also $n_x$ vectors) with covariance:

$$\mathbb{E}[v(k)v(k)'] = Q(k). \quad (B2)$$

The measurement equation is:

$$z(k) = h(x(k), k) + w(k) \quad k=1, \quad (B3)$$

with h(·) being a nonlinear function of kinematic state and w(k) the sequence of zero-mean Gaussian measurement noise with covariance:

$$\mathbb{E}[w(k)w(k)'] = R(k). \quad (B4)$$

The matrices F, Q, R and the function h(·) are assumed to be known and possibly time varying. In other words, the system can be time varying and the noises nonstationary. The Jacobian of the measurement model h(x(k), k) with respect to k is defined as:

$$C(k) = \frac{\partial H(x(k), k)}{\partial x(k)}. \quad (B5)$$

The initial kinematic state x(0), in general unknown, is modeled as a random variable, Gaussian distributed with known mean and covariance. The two noise sequences and the initial kinematic state are assumed to be mutually independent. This constitutes the Linear-Gaussian (LG) assumption.

The conditional mean:

$$\hat{x}(j|k) = \mathbb{E}[x(j)|Z^k], \quad (B6)$$

where $Z^k = \{z(j), j \leq k\}$ denotes the sequence of observations available at time k, is the estimate of the kinematic state if j=k and predicted value of the kinematic state if j>k. The conditional covariance matrix of x(j) given the data $Z^k$ or the covariance associated with the estimate is:

$$P(j|k) = \mathbb{E}[[x(j) - \hat{x}(j|k)][x(j) - \hat{x}(j|k)]'|Z^k]. \quad (B7)$$

The estimation algorithm starts with the initial estimate $\hat{x}(0|0)$ of $x(0)$ and the associated initial covariance $P(0|0)$, assumed to be available. The second (conditioning) index 0 stands for $Z^0$, the initial information.

One cycle of the dynamic estimation algorithm—the Extended Kalman filter (KF)—will thus consist of the computations to obtain the estimate:

$$\hat{x}(k|k) = \mathbb{E}[x(k)|Z^k] \quad (B8)$$

which is the conditional mean of the kinematic state at time k (the current stage) given the observation up to and including time k, and the associated covariance matrix:

$$P(k|k) = \mathbb{E}[[x(k)-\hat{x}(k|k)][x(k)-\hat{x}(k|k)]'|Z^k]. \quad (B9)$$

ABBREVIATIONS

3GPP 3$^{rd}$ Generation Partnership Project
ASIC Application Specific Integrated Circuits
BTS Base Transceiver Stations
CD Compact Disc
CN Core Network
COTS Common Off-The-Shelf
CPE Customer Premises Equipment
CPU Central Processing Units
DSP Digital Signal Processors
DVD Digital Versatile Disc
EKF Extended Kalman Filter
eNB evolved Node B
FPGA Field Programmable Gate Arrays
GIS Geographical Information System
gNB New Radio Node B
GPS Global Positioning System
HDD Hard Disk Drive
HW hardware
IMM Interacting-Multiple-Model
I/O input/output
LEE Laptop Embedded Equipment
LME Laptop Mounted Equipment
LTE Long-Term Evolution
MEM memory units
NB Node B
ND Network Device
NFV Network Function Virtualization
NI Network Interfaces
NIC Network Interface Controller
NR New Radio
OS Operating System
OSS Operations and Support System
PC Personal Computer
PDA Personal Digital Assistant
PLC Programmable Logic Controllers
RAM Random Access Memory
RAN Radio Access Network
REG registers
ROM Read-Only Memory
RRU Remote Radio Units
RTT Round-Trip-Time
STA Station
SW software
UE User Equipment
USB Universal Serial Bus
VM Virtual Machine
VMM Virtual Machine Monitor
VNE Virtual Network Element
WNIC Wireless Network Interface Controller

REFERENCES

[1] T. Wigren, "Wireless hybrid positioning based on surface modeling with polygon support", Proc. VTC 2018 Spring, Porto, Portugal, June 2018.

The invention claimed is:

1. A method for kinematic state estimation of a user equipment connected to a wireless communication network, said method being performed by a node associated with said wireless communication network, and wherein said method comprises the steps of:
   obtaining range rate measurement data defining a change rate of a distance between said user equipment and a range rate measuring positions, said range rate measurement data comprising data of Doppler measurements;
   obtaining range measurement data defining a distance between said user equipment and a range measuring position;
   performing a kinematic state estimation of said user equipment based on at least said range rate measurement data and said range measurement data;
   wherein said step of performing a kinematic state estimation comprises interacting- multiple-model filtering comprising three interacting models;
   wherein said interacting-multiple-model filtering comprises a three-dimensional constant velocity movement Wiener process, a three-dimensional constant acceleration movement Wiener process, and a three-dimensional constant position Wiener process.

2. The method according to claim 1, wherein said step of performing a kinematic state estimation is performed in two part steps, one for performing a kinematic state estimation based on said range rate measurement data and one for performing a kinematic state estimation based on said range measurement data.

3. The method according to claim 1, comprising the further steps of:
   obtaining a range-rate time defining when said range rate measurement was performed; and
   obtaining a range time defining when said range measurement was performed.

4. The method according to claim 3, wherein said step of performing a kinematic state estimation is performed as a combined estimation based on said range rate measurement data as well as said range measurement data if said range-rate time is equal to said range time.

5. The method according to claim 1, wherein said step of obtaining range rate measurement data comprises receiving said range rate measurement data from another node, or performing a range rate measurement concerning said user equipment.

6. The method according to claim 1, wherein said range measurement data comprises data based on a propagation time measurement or data based on a power measurement and/or said range measurement data comprises data associated with a path loss measurement, and/or said range measurement data comprises data associated with a timing advance measurement or a round trip time measurement.

7. The method according to claim 1, wherein said step of obtaining range measurement data comprises receiving said range measurement data from another node, or performing a range measurement concerning said user equipment.

8. The method according to claim 1, comprising the further steps of:
obtaining data enabling determination of said range rate measuring position; and
obtaining data enabling determination of said range measuring position.

9. The method according to claim 1, further comprising repeating at least one of said step of obtaining range rate measurement data and said step of obtaining range measurement data as well as said step of performing a kinematic state estimation for additional measurements concerning said user equipment.

10. The method according to claim 9, wherein said repeating is performed for measurements performed by different nodes.

11. The method according to claim 9, wherein said repeating is performed for non-synchronized measurements.

12. The method according to claim 1, comprising the further step of obtaining an identity of said user equipment.

13. The method according to claim 12, further comprising repeating at least one of said step of obtaining range rate measurement data and said step of obtaining range measurement data as well as said step of performing a kinematic state estimation for additional user equipment.

14. The method according to claim 1, comprising the further step of subtracting a geographical ground altitude from an estimated altitude to obtain an altitude above ground.

15. The method according to claim 1, comprising the further step of initiating a transmission of kinematic state estimate information, said kinematic state estimate information comprising a kinematic state estimate information identifier, a user equipment identity, a time when said kinematic state estimate information is valid, and an estimated kinematic state, which estimated kinematic state comprises at least a three-dimensional position and preferably also a three-dimensional velocity.

16. The method according to claim 1, comprising the further step of:
initiating an action on a communication with said user equipment based on said kinematic state estimation, wherein said step of initiating an action comprises initiating a prohibition of downlink communication from non-authorized parties to said user equipment, and/or said step of initiating an action comprises initiating a prohibition of at least a part of uplink communication from said user equipment, and/or said step of initiating an action comprises initiating a detachment of said user equipment from said wireless communication network.

17. A node, configured for kinematic state estimation of a user equipment connected to a wireless communication network,
wherein said node is configured to obtain range rate measurement data defining a change rate of a distance between said user equipment and a range rate measuring positions, said range rate measurement data comprising data of Doppler measurements;
wherein said node is further configured to obtain range measurement data defining a distance between said user equipment and a range measuring position; and
wherein said node is further configured to perform a kinematic state estimation of said user equipment based on at least said range rate measurement data and said range measurement data;
wherein said node is configured to perform said kinematic state estimation by utilizing interacting-multiple-model filtering comprising three interacting models;
wherein said interacting-multiple-model filtering comprises a three-dimensional constant velocity movement Wiener process, a three-dimensional constant acceleration movement Wiener process, and a three-dimensional constant position Wiener process.

18. A wireless communication network comprising at least one node according to claim 17.

19. A computer-program product comprising a non-transitory computer-readable medium having stored thereon a computer program comprising instructions, which when executed by at least one processor, cause the at least one processor to obtain range rate measurement data defining a change rate of a distance between a user equipment and a range rate measuring position, to obtain range measurement data defining a distance between said user equipment and a range measuring position, said range rate measurement data comprising data of Doppler measurements, and to perform a kinematic state estimation of said user equipment based on at least said range rate measurement data and said range measurement data, wherein said performing of a kinematic state estimation comprises interacting-multiple-model filtering comprising three interacting models, wherein said interacting-multiple-model filtering comprises a three-dimensional constant velocity movement Wiener process, a three-dimensional constant acceleration movement Wiener process, and a three-dimensional constant position Wiener process.

* * * * *